US012510360B2

(12) United States Patent
Doughty et al.

(10) Patent No.: US 12,510,360 B2
(45) Date of Patent: Dec. 30, 2025

(54) DETERMINING THAT A REUSABLE PALLET IS UNLADEN

(71) Applicants: John Doughty, Acworth, GA (US); Charles M. Link, II, Atlanta, GA (US)

(72) Inventors: John Doughty, Acworth, GA (US); Charles M. Link, II, Atlanta, GA (US)

( * ) Notice: Subject to any disclaimer, the term of this patent is extended or adjusted under 35 U.S.C. 154(b) by 294 days.

(21) Appl. No.: 18/367,439

(22) Filed: Sep. 12, 2023

(65) Prior Publication Data

US 2024/0085184 A1 Mar. 14, 2024

Related U.S. Application Data

(60) Provisional application No. 63/406,232, filed on Sep. 13, 2022.

(51) Int. Cl.
*G01C 21/16* (2006.01)
*G06Q 10/08* (2023.01)

(52) U.S. Cl.
CPC ........... *G01C 21/165* (2013.01); *G06Q 10/08* (2013.01)

(58) Field of Classification Search
CPC .............................. G01C 21/165; G06Q 10/08
See application file for complete search history.

(56) References Cited

U.S. PATENT DOCUMENTS

| | | | | |
|---|---|---|---|---|
| 9,047,522 B1* | 6/2015 | Nikitin | ............... | G06K 7/10009 |
| 9,230,227 B2* | 1/2016 | Muirhead | ............... | G06Q 10/08 |
| 11,518,572 B2* | 12/2022 | Ceré | ................... | B65D 71/0096 |
| 2007/0295822 A1* | 12/2007 | Kawai | ................ | B65D 19/0012 |
| | | | | 235/492 |
| 2008/0103944 A1* | 5/2008 | Hagemann | ......... | G06Q 10/0833 |
| | | | | 108/51.11 |
| 2016/0139591 A1* | 5/2016 | Schulze | ................ | B62B 5/0093 |
| | | | | 700/214 |
| 2019/0235092 A1* | 8/2019 | Bastian | .................... | G01P 15/04 |
| 2021/0009310 A1* | 1/2021 | Moeller | ........... | G06K 19/07786 |

* cited by examiner

*Primary Examiner* — Ramsey Refai
(74) *Attorney, Agent, or Firm* — John L. Doughty; DOUGHTY LAW, L.L.C.

(57) ABSTRACT

A tracking device comprises a processor and an accelerometer. The tracking device may be affixed to a pallet. The accelerometer may generate one or more acceleration values responsive to movement of the tracking device/pallet. Movement of the palette may result in the accelerometer generating a number of acceleration values, exceeding a magnitude threshold, that is higher than a configured number of acceleration values that correspond to the magnitude threshold. A number of determined acceleration values exceeding the configured number of acceleration values may result in a determination by the processor that the pallet is unladen. Based on the determination that the palette is unladen, the processor may generate an unladen message. The processor may direct transmission of the unladen message corresponding to the unladen packet to a pallet tracking management application, which may use the unladen message to facilitate pallet logistics operations.

20 Claims, 16 Drawing Sheets

400

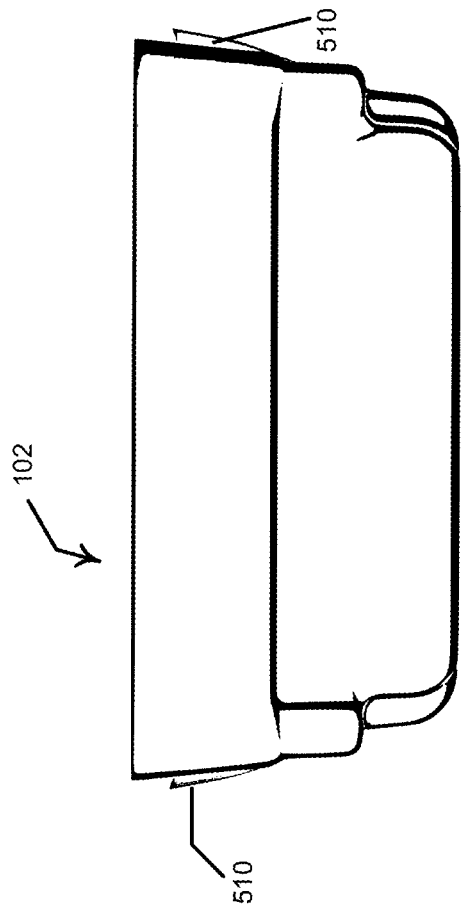
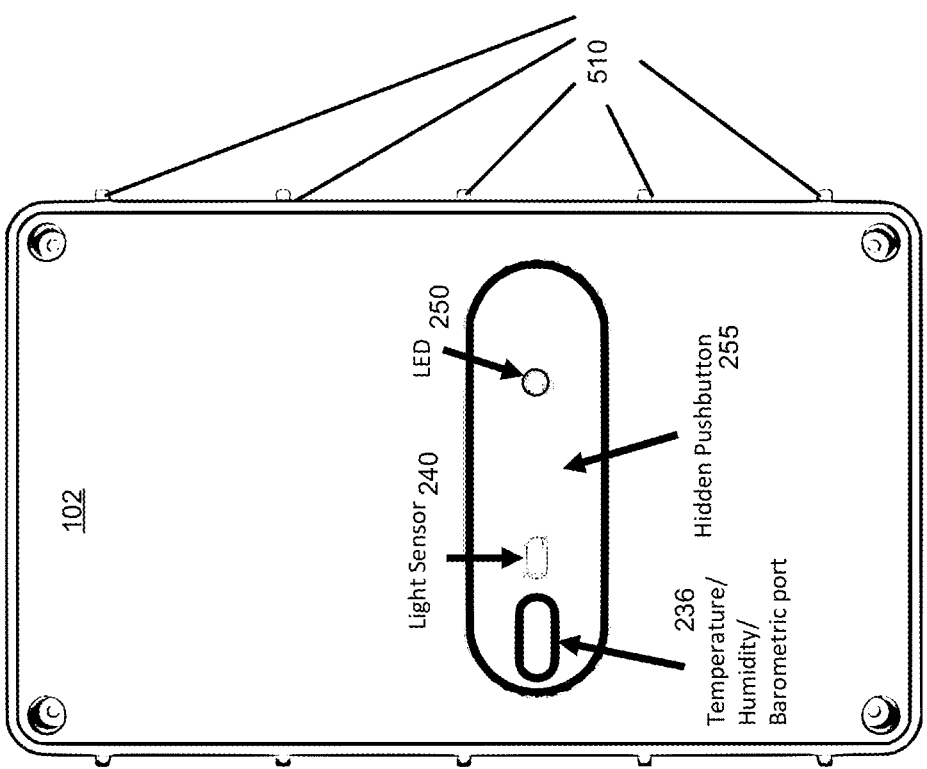

DETERMINING THAT A REUSABLE PALLET IS UNLADEN

CROSS REFERENCE TO RELATED APPLICATION

This application claims priority under 35 U.S.C. 119(e) to U.S. provisional patent application No. 63/406,232 "Method and system for that a reusable pallet is available to be retrieved and recycled to next user," which was filed Sep. 13, 2022, and which is incorporated herein by reference in its entirety.

SUMMARY

A battery powered electronic asset tracking device that facilitates asset tracking may be attached to or embedded into pallets or skids, which may be usable to support or transport goods. The pallets may facilitate stability of goods supported thereby in a stable fashion while being lifted by a forklift, a pallet jack, a front loader, a jacking device, a crane, or other similar lifting equipment. The battery powered electronic asset tracking device may facilitate multiple purposes and functionality ranging from determining the geographic location of the pallet and its contents, to detecting unusual environmental conditions of the freight, to determining unusual movement conditions of the freight. The electronic asset tracking device may comprise facilitate methods to sense and report pallet events and conditions to a central cloud-based management system that may provide information to a pallet owner or other user of a pallet, to a shipping companies, to parties shipping goods on the pallet, or to other interested parties or organizations.

In an example embodiment, a method may comprise receiving, by a computing device comprising a processor, at least one movement indication indicative of movement of a tracking device. The method may comprise analyzing, by the computing device, the at least one tracking device movement indication with respect to a tracking device movement criterion to result in an analyzed movement indication and determining, by the computing device, that the analyzed movement indication satisfies the tracking device movement criterion to result in a determined movement indication. Based on the determined movement indication, the method may further comprise generating, by the computing device, an unladen indication indicative that the tracking device corresponds to an unladen transportation asset.

In an embodiment, the unladen transportation asset is a pallet. In an embodiment, the tracking device movement criterion comprises an acceleration decay threshold. For example, a decay threshold may be a determined number of acceleration value samples corresponding to an acceleration value that are above a magnitude that corresponds to the asset being placed on a surface such as a concrete floor. The determined number of acceleration value samples may be determined based on test data.

The at least one movement indication may correspond to at least one respective acceleration magnitude sample generated by the tracking device, wherein the acceleration decay threshold is a number of the at least one acceleration magnitude sample that differs from a baseline acceleration magnitude more than a configured acceleration magnitude. The at least one movement indication may correspond to at least one respective acceleration magnitude sample generated by the tracking device, wherein the acceleration threshold is an acceleration magnitude.

In an embodiment, the movement indication may be a final movement indication corresponding to a final movement of the tracking device, and the method may further comprise receiving, by the computing device, an initial movement indication indicative of an initial movement of the tracking device, wherein the initial movement resulted in the tracking device waking up.

In an embodiment, the method may further comprise determining, by the computing device, a movement period corresponding to a period between the initial movement and the final movement. The method may comprise analyzing the movement period with respect to a movement period criterion to result in an analyzed movement period, and determining, by the computing device, based on the analyzed movement period satisfying the movement period criterion, that the final movement corresponds to the unladen transportation asset being set down to result in a determined set-down occurrence.

The method may further comprise determining, by the computing device, that the determined set-down occurrence satisfies a set down occurrence criterion. Based on the determined set-down occurrence satisfying the set down occurrence criterion, the method may further comprise transmitting, by the computing device to a management computing system, or a management application executing thereon or being executed thereby, a retrieval indication indicative that at least the unladen transportation asset is to be retrieved from a current location of the unladen transportation asset and transported to a target location. The management computing system may correspond to an owner of the unladen transportation asset.

In an embodiment, the method may further comprise determining, by the computing device, a movement period corresponding to a period between the initial movement and the final movement and analyzing the movement period with respect to a movement period criterion to result in an analyzed movement period. The method may further comprise determining, by the computing device, based on the analyzed movement period failing to satisfy the movement period criterion, that the final movement corresponds to nonmovement, with respect to location, of an object with which the tracking device is associated.

In an embodiment, the computing device may be part of the tracking device.

In another example embodiment, a tracking device may comprise a motion detecting component. The tracking device may further comprise a processor configured to receive, from the motion detecting component, at least one movement indication indicative of movement of the tracking device and to analyze the at least one tracking device movement indication with respect to a tracking device movement criterion to result in an analyzed movement indication. The processor may be further configured to determine that the analyzed movement indication satisfies the tracking device movement criterion to result in a determined movement indication; and, based on the determined movement indication, generate an unladen indication indicative that the tracking device corresponds to an unladen transportation asset.

The tracking device movement criterion comprises an acceleration function. The acceleration function may comprise an acceleration threshold and the tracking device movement criterion may be satisfied by the at least one movement indication being indicative of an acceleration value that exceeds the acceleration threshold. The acceleration threshold may be a magnitude threshold or a number of times magnitudes of acceleration sample values exceed an acceleration magnitude threshold.

In an embodiment, the motion detecting component may comprise an accelerometer, wherein the at least one movement indication is a first at least one movement indication. The processor may be further configured to receive, from the motion detecting component before receiving the first at least one movement indication, a second of the at least one movement indication indicative of movement of the tracking device, and to exit a sleep state upon receiving the second at least one movement indication. The tracking device movement criterion comprises an acceleration function.

In an embodiment, the processor may be further configured to determine a movement period beginning at a first time corresponding to the second movement indication and ending at a second time corresponding to the first movement indication. The processor may be further configured to analyze the movement period with respect to a movement period criterion to result in an analyzed movement period and to determine that the analyzed movement period satisfies the movement period criterion to result in a determined movement period. Based on the determined movement period, the processor may be further configured to determine that an asset corresponding to the tracking device has been intentionally moved.

In yet another example embodiment, a non-transitory machine-readable medium may comprise executable instructions that, when executed by a processor of a tracking device, facilitate performance of operations, comprising receiving, from a movement detecting component of the tracking device, at least one movement indication indicative of movement of an asset corresponding to the tracking device, and analyzing the at least one tracking device movement indication with respect to a tracking device movement criterion to result in an analyzed movement indication. Based on the analyzed movement indication, the operations may further comprise generating, by the computing device, a laden indication indicative of a laden characteristic of the asset, and transmitting a laden characteristic message, directed to an asset management application, indicative of the laden characteristic.

In an embodiment, the tracking device movement criterion may comprise an acceleration function. The laden indication may be indicative that the laden characteristic corresponds to the asset being unladen. The acceleration function may comprise an acceleration threshold. The tracking device movement criterion may comprise a high relative acceleration occurrences threshold. The at least one movement indication may comprise at least one high relative acceleration magnitude value. The at least one high relative acceleration magnitude value equaling or exceeding the acceleration threshold occurring as frequently as, or more frequently than, the high relative acceleration occurrences threshold may correspond to the asset being unladen.

In an embodiment, the acceleration function may comprise an acceleration threshold. The tracking device movement criterion may comprise a high relative acceleration occurrences threshold. An at least one high relative acceleration magnitude equaling or exceeding the acceleration threshold occurring less frequently than a high relative acceleration occurrences threshold may correspond to the asset being laden.

BRIEF DESCRIPTION OF THE DRAWINGS

FIG. 6A illustrates a tracking device with multiple ribs.

FIG. 6B illustrates a tracking device inserted in a pallet pocket.

DETAILED DESCRIPTION

Figure 1:
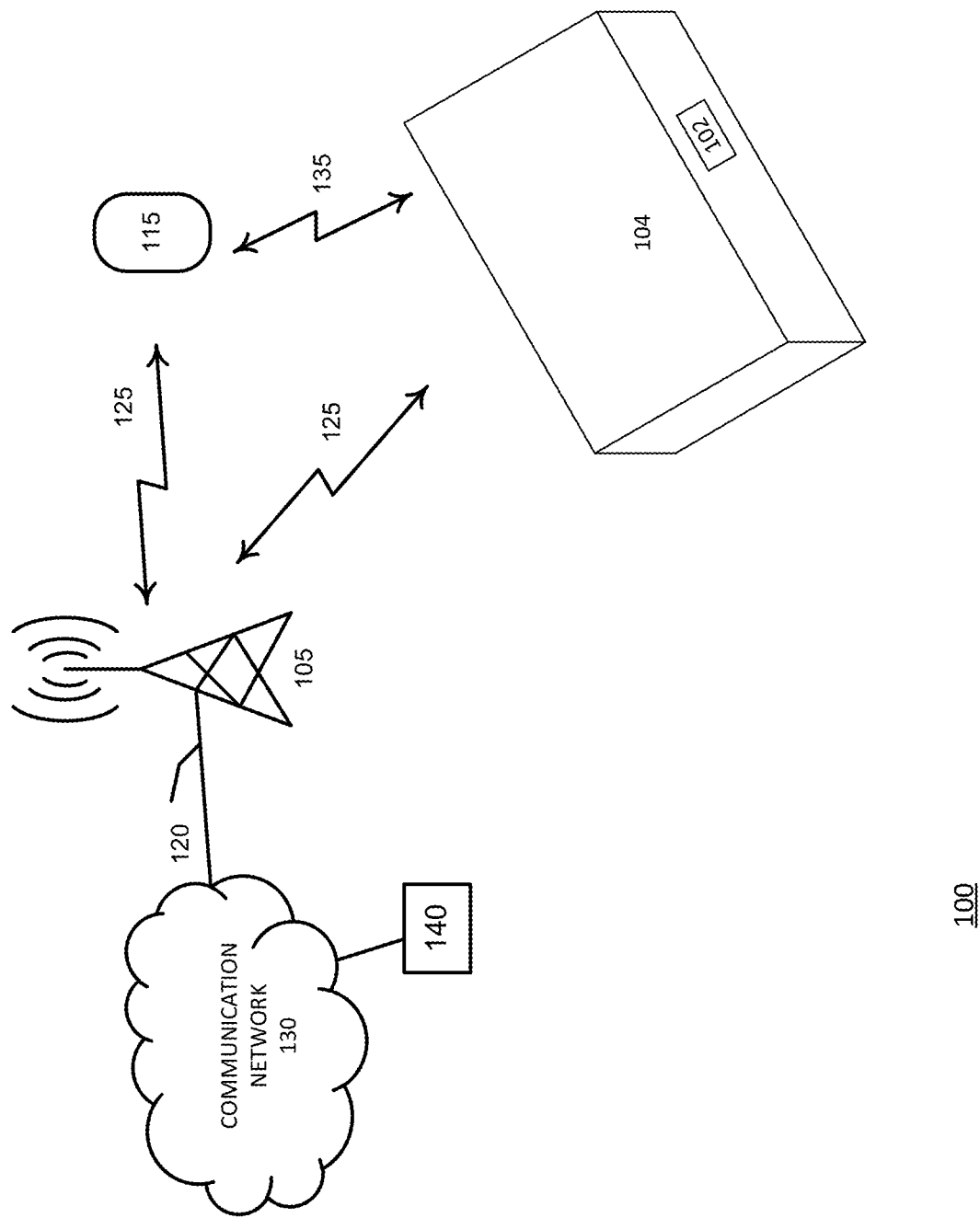
FIG. 1 illustrates an environment with a tracking device fixed to a pallet.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Pallets or skids are structural foundations for holding a unit load of goods which allows handling and storage efficiencies. Goods or shipping containers are often placed on pallets secured with strapping, stretch-wrap or shrink-wrap and shipped as a unit. Pallets are typically constructed of materials such as wood, plastic, fiberglass, metal, paper, recycled materials, or composite materials. Pallets have standard sizes allowing efficient loading, unloading and movement in standard sized transport vehicles. Pallets sizes enable the ability to pass through standard doors and warehouse isles making handling more efficient.

Pallets are used by manufacturing companies to transport food, beverages, building materials and other manufactured products to wholesalers and retailers. With the proliferation of the modern warehouse style retail stores, pallets are frequently used within the retail store for storage and display, and they are removed once the retail product units are depleted and sold.

Due to environmental concerns, disposal challenges, and pallet manufacturing costs, pallet pooling is becoming more common. Used low-quality pallets are expensive to dispose of, and recyclers typically charge disposal fees even though the pallet is sold to another company for reuse. The pallet pooling suppliers provide their customers and users with reusable pallets. Typically, the reusable pallets are a high quality, heavy-duty pallets and are designed for multiple use cycles. The pallet supplier cleans, repairs, delivers, and retrieves reusable pallets. Some government legislation in various geographies requires the reuse of packaging items in preference to recycling and disposal.

Not only are standardized pallets reused, but custom pallets are also reused. Examples include pallets specifically designed for carrying automotive parts to auto manufacturers from their suppliers, beverage pallets that are designed to facilitate the movement and distribution of beverages to small retail stores and machinery pallets used to transport heavy duty machinery and parts. Many of these custom reusable pallets have features that enable the efficient transportation of odd-shaped materials and easy movement thru factories. Sometimes the pallets are sized to enable easy movement thru standard sized doors used by smaller retail and convenience stores.

Wooden pallets typically consist of three or four stringers that support many deckboards, on top of which goods are placed. Pallet users want pallets to easily pass-through buildings, to stack and fit in standardized racks, to be accessible to forklifts and pallet jacks and to function in automated warehouses. Pallets are sized for packing tightly inside transport trailers, intermodal containers, and vans. A standard pallet is designed to hold up to 4600 pounds of cargo. Weight capacity will vary with construction techniques and material. Typically, high-quality plastic pallets are not able to carry more than 3500 pounds of cargo, but offer the added value that they won't rot, splinter or warp and are much easier to clean.

The pallet pooling business is a major shift away from disposable wooden pallets commonly used by manufacturing companies in the past. The high price of high-quality disposable wooden pallets has the undesired effect of burdening the product with unnecessary extra costs. Pooled pallets are typically acquired from a pooling company for short term use at a very reasonable per cycle charge. Goods are loaded and secured to the pallets, shipped to a receiving party and then the pallet is retrieved by the pooling company and cycled to the next user. A typical pooled pallet has a life of multiple years and many trips if the pooling company cleans and repairs the pallets diligently. The typical pooled pallet rental fee is based on delivery to the freight originating company, or goods manufacturer, and it includes the retrieval from the freight destination, typically the last step in the logistics chain where the pallet is unloaded. Sometimes pallets make several stops during the goods delivery, perhaps to intermediate warehouses and freight terminals where the pallet contents remain intact, on the way to the final freight destination where the pallet is unloaded.

The pallet pooling company typically will retrieve the pallet from the final destination, only after the pallet is unloaded. In the modern world of warehouse stores, that pallet might stop at regional warehouses, or it might go directly from the originating manufacturing site directly to a warehouse store. Furthermore, the pallet in a warehouse store might sit for days or weeks in a pallet rack, high above the customers' heads before it is lowered to floor level enabling the customers to gradually remove products from the loaded pallet. Once the pallet is empty it is moved, typically by forklift to a storage area either inside or outside of the store. Due to OSHA regulations and fire codes, empty pallets must be managed carefully. Sometimes the empty pallets are stored outside the retail store right next to trash dumpsters where scavengers pick up the empties for resale to someone else, perhaps to a pallet remanufacturer for reuse or for use as repair parts for other pallets, but sometimes for use as firewood, low-cost wood furniture or other inefficient and environmentally unfriendly disposal methods.

It is desirable on the part of the pallet pooling company to track their high-quality, heavy-duty pallets to keep them from becoming anything other than pallets for transportation of goods. Usually, somebody is on the hook for paying for lost pallets, whether it is the originating manufacturing company or the destination goods receiver. If the pallet is part of a private reusable group of shipping containers, lost pallets are a capital expense that does not add value to the bottom line. Ideally the shipping pallets will be temporarily stored, retrieved, cleaned, and reused, regardless of ownership and business purpose. In that end, tracking the whereabouts of pallets, empty or not, is desirable.

Generally, it is the goods and materials secured to the pallets that are the subject of tracking, with value being in tracking the goods and materials secured to the pallet. Therefore, a logistics tracking device typically is attached to high value goods being transported by the pallet. However, attaching a logistics tracking device is not without challenges. Logistics tracking devices are created to sense certain environmental conditions and provide a "chain of custody" record for the goods being transported. For example, a package containing high value pharmaceuticals might contain a logistics tracker. Perhaps the pharmaceuticals can't be exposed to high temperatures or high humidity. The logistics tracker would need sensors that constantly measure temperature and/or humidity. Leveraging a tracking device on a pallet could enable multiple packages that are secured to the pallet to be monitored for undesirable environmental conditions.

Logistics tracking goes beyond simple temperature and humidity though. For chain of custody, perhaps a shipper might want to know if a package is opened. Perhaps the shipment contains Schedule II drugs. Schedule II drugs, substances, or chemicals are defined as drugs with a high potential for abuse, with use potentially leading to severe psychological or physical dependence. A pharmaceutical company that ships Schedule II drugs wants to know everything about that package or container, including unscheduled stops or packages that are opened along the way as well as delivery confirmation. With the correct pallet electronics and sensors within each box on the pallet, a pallet tracking device could easily be set up to provide geolocation tracking and event recording. Furthermore, the pallet tracking device could be linked to low-cost sensors contained within each individual package, providing temperature, and package opening alerts, as well as location and time of events where a package is removed from pallet. Certainly, extremely high value assets loaded on a pallet could justify independent cellular connected devices sensing, recording, reporting and event notifications.

The traditional challenges with both pallets and independent cellular connected devices used by logistics companies are similar. The principle is the high unit cost and unnecessary waste driving shippers to use reusable pallets and reusable logistics asset trackers. The pallet pooling industry already has a very well refined and efficient recycling ecosystem. Unfortunately, the reusable logistics asset tracking business is not as refined and efficient. While the pallets are unwieldly and difficult to dispose of due to their size, the reusable logistics asset trackers are small and convenient to dispose of, quickly becoming just another Electronic Waste (E-Waste) product that goes unnecessarily into dumps, sometimes containing hazardous substances in the batteries.

By permanently affixing a long life, reusable, multi-function logistics asset tracker to a pallet, E-Waste is no longer a major problem. If the pallet is recycled and reused, then the electronics and potentially hazardous batteries are reused. From a cost perspective, adding a long-life logistics asset tracker adds significant cost. An early estimate is that adding that logistics asset tracker will add 20% to the overall pallet cost. The intrinsic value of the asset tracker must exceed the extrinsic value. That is, the cost premium for adding a long-life logistics tracker must be lower than the value that may be recouped or saved for the pallet pooling ecosystem, and transportation operations. If the only use case for a long-life logistics asset tracker is to locate a pallet to recover it, then the cost might be considered high if only at tiny percentage of the pallets are normally misplaced.

Adding additional value-added services to the logistics tracker increases the pallet value to their customers. If a customer has a choice without a huge cost premium, he may desire the smarter pallet. For example, if a customer is shipping produce that must be delivered within a certain time frame and in conditions that don't exceed a certain temperature, then the smart pallet could add considerable value by alerting the shipper and receiver of transportation mishandling. If the temperatures are exceeded, then the produce spoils and becomes worthless. If the produce gets stuck in a hot truck terminal or transloading facility for an extended period, it may become spoiled and worthless. Fresh produce receivers and end customers have an expectation of a certain shelf life and delayed shipments can significantly reduce the produce value. Smart pallet trackers can be set with adjustable parameters to report when a pallet is static for an extended period or in unacceptable environmental conditions like high temperature, based on the type of produce the pallet is transporting.

Not only is it desirable to report on the temperature of the pallet, but perhaps the pallet contains one or more refrigerated containers. These containers could be equipped with low-cost short-range tags that sense temperature or other environmental conditions, including humidity, vibration, pressure, impacts or shocks. These tags can be very basic without any intelligence other than a single periodic sensor (s) report. The on-board pallet tracker with a long-range cellular radio can be equipped with a similar technology short-range receiver that monitors for such tags. If any of the monitored conditions are exceeded, then time and location records or event records could be collected and reported via long-range cellular or stored for later collection by either short-range radio or long-range radio.

Battery life is key to a pallet-based logistics asset tracking device. A reusable heavy-duty, high-quality pallet may have a 10-year usable lifetime with cleaning and repairs. The electronics for the logistics asset tracker should also last the lifetime of the pallet. Batteries are the key element of the asset tracker because if the tracker is protected from water and excessive humidity, the electronics should last the expected lifetime. Creating methods that optimize battery life and minimize power usage is key. Of course, certain asset tracking product offerings may add more revenue opportunities than the cost of replacing the batteries. Not every pallet will be used under the same conditions, so battery condition reporting is desirable. The battery condition may be monitored using continuous coulomb counting or the battery condition may be monitored using a method where usage events are monitored and totalized to generate an estimated battery condition. Alternatively, certain battery measurements periodically could trigger battery condition notification events.

A pallet tracker can be set to report periodically, or it can be set to report only on demand to maximize battery life. If a pallet tracker is set to report periodically, that report could be old and out of date by the time the information is needed. The periodic location is only as good as the last location report. If the pallet reports once per week, the actual current location could be significantly different than the last reported location. If the pallet reports twice daily, the battery life would be 14 times shorter than once per week reporting. A combination of a movement event or a lack of movement event can be intelligently used to control location reporting. For example, if the pallet is on the move, perhaps it can be set to report once every hour. But if the device is not moving, maybe it can be set to report only once per week. Managing the reporting times and other operational report parameters can be configured over the air or locally, depending on the actual software operating on the pallet tracking electronics.

If a pallet is static and waiting for use at a freight originating location (manufacturer), then the reporting times while it is idle are less important than if the pallet is static and waiting for pickup at a freight destination location. Any time a pallet is waiting for pickup after use, but before reuse, the pallet is a wasted revenue opportunity for the pallet pooling company. A pallet pooling company needs to retrieve their pallet assets from the freight destination location quickly because it won't be generating any additional revenue until it is recycled. Further, the longer the pallet sits idle at the freight destination, the more likely it becomes a lost asset. Ideally, every pallet would make its way from the pallet pooling distribution warehouse to the freight origination company location, get loaded immediately, then shipped with goods, get unloaded immediately and retrieved by the pallet pooling company for cleaning and repairs, as required, then back to the distribution warehouse for the next cycle of its life.

That cycle could happen in a few days, or more realistically that cycle could require 45 days or more. Since delivering and retrieving pallets is expensive requiring truck transportation and worker resources, it is desirable to group many pallets to be delivered or retrieved at one time. An additional consideration is that an origination location or a destination location may have only so much space for storing idle pallets either waiting to be used or waiting to be retrieved. Ideally, the pallet pooling company knows exactly when to deliver more pallets to the freight origination company location and exactly when to retrieve pallets from the freight destination company location. Ideally those pallets can be delivered and retrieved, minimizing over-the-road miles for empty pallets and partially empty transport trucks. Ideally pallets that are clean and in good repair don't even need to be returned directly to the pooling company depot location but may be transferred directly to another freight origination company location without making the trip to the cleaning and repair depot. The cycle might be completed by the freight origination company truck picking up empty pallets at the freight destination company location, using an otherwise empty truck, returning the previously used pallets directly to the freight origination company location for reuse, while the pallet owner is compensated for an additional cycle, but the freight origination company receives a discount for transporting empty pallets back to be reused. All of this may be managed by smart pallet electronics, containing the proper sensors.

Smart pallet tracking enables the logistics managers to identify bottlenecks, delays, and trends that affect anticipated delivery of goods. It enables shippers and customers to know exactly what is happening with their supply chain. Smart pallet trackers enable a new layer of visibility for customers who receive goods shipped on pallets, without burdening the shipping companies, and truck operators to adopt new technologies for each shipper or receiver. Many times, goods are shipped via services that move less than a full truckload ("LTL"). Logistics companies specialize in LTL shipping and visibility is limited to planned transfer points in most cases. Goods might be misrouted due to weather or unanticipated traffic along a planned route. Shipments might be rerouted because of the delays and misconnections. Shipments might travel to incorrect locations due to accidental misloading or unloading. Smart pallet trackers can reassure shippers and customers that their goods aren't dwelling in a forgotten corner of a transloading facility.

One of the missing elements of smart pallet tracking is pallet status. A pallet at a freight originating location is one that is most likely empty, but it is expected that the empty pallet is soon to be loaded with goods and shipped. From the perspective of the pallet pooling company, understanding the idle time of those empty pallets at the freight originating location is important. They are unutilized assets until they are on the move. Since the principal revenue for the pallet pooling company is based on "pallet turns" or completed cycles, it is to the advantage of the pallet pooling company to minimize the number of empty pallets onsite at the freight originating location.

The other side of this proposition is that the manufacturing company at the freight originating location may be storing manufactured, but unsold, goods on pallets owned by the pallet pooling company. From the manufacturer's perspective, a loaded pallet is a pallet ready to ship if the goods thereon have been sold. Pallets themselves are ideal components of a warehouse shelving system and the high-quality heavy-duty pallets of the pallet pooling company only add to the ease and neatness of operating a finished product warehouse. Leveraging the shipping pallet means that the manufactured product needs less handling than if the manufactured product is transferred from a storage shelf or pallet to a shipping pallet. Certainly, knowing if the pallets are used for storage is useful information for the pallet company if the pallet company has idle revenue-generating assets at customer locations.

The freight destination company location could also be using the pooling company's pallets for longer term product storage within either intermediate warehouses or retail warehouse stores. Again, the high-quality pallets provide a neat and organized shelving system but do so at the expense of the pallet pooling company. Knowing if the pallets are empty and available for pickup is a valuable bit of information for a company that depends upon revenue from asset cycles.

Embodiments disclosed herein may facilitate an electronic pallet tracker determining that a pallet is empty or loaded with goods. Embodiments disclosed herein may facilitate managing environmental conditions and events within packages of goods loaded on a pallet. Embodiments disclosed herein may facilitate tracking and tracing the transportation routing and delays. Embodiments disclosed herein may facilitate reporting extended dwell time for goods loaded on a pallet. Embodiments disclosed herein may facilitate managing the delivery and retrieval of empty pallets for use in a pallet-based shipping logistics system.

As previously discussed, smart pallet logistics depends firstly upon a wireless connection between a pallet equipped with a special tracking device containing at least a communications device. At least some method of communications between the pallet communicator and the cloud is required. That communication method can be cellular using 2G, 3G, 4G, 5G or subsequent communication infrastructure, including LTE, LTE CAT-M, NB-IOT, GPRS, GSM, LoRaWAN (also known as LoRa), private mobile radio, all considered long-range radio systems, or the communication method can be Wi-Fi, Bluetooth, wireless local area networking (WLAN), Wi-Fi Peer-to-Peer (AKA Wi-Fi Direct), personal area networks, ZigBee, Wi-Fi HaLow, private custom radio technology using licensed or unlicensed spectrum, all considered short-range radio systems.

Additionally various satellite communication systems could facilitate wireless communication between the smart pallet and the stationary computing system. Those systems could utilize artificial satellites that relays and amplifies radio telecommunications signals. The satellites could be in geostationary orbit, or they could be in low earth orbits. The satellite communication systems could have one or multiple satellites to facilitate point to point communication.

A requirement of the smart pallet logistics is a method to determine the location to a degree of accuracy required by the stakeholders. The accuracy could be as accurate as 1 foot or with as much error as a typical city. Knowledge of the location is important to determine geographically whether the pallet is in a static location, or it is on the move. Ideally location is available whether the pallet is outside with sky visibility or inside with no visibility. Location could be determined using one of the various GNSS systems, including GPS, BeiDou, Galileo, Glonass, and may optionally include location enhancement technologies such as WAAS, EGNOS, or QZSS.

Other methods of location determination are available, including Wi-Fi Positioning, Bluetooth, Bluetooth Low Energy [BLE], Ultra-Wide Band [UWB], cell tower triangulation, cell-ID, Polte, and other custom RF based location determination methods. Some of these methods incorporate RSSI Multilateration, RSSI Fingerprinting, Time-of-Flight [ToF], Angle of Arrival [AoA], RTLS, location determination by broadcast signal triangulation, Indoor positioning systems, or any other location determination system. All these current methods work to deliver location and these methods can be combined to use the single wireless communication radio to determine a location to the desired accuracy depending on the technology.

A requirement of the smart pallet logistics is a method to determine movement. Ideally a three-axis accelerometer provides movement indications to the smart pallet tracking device. A three-axis accelerometer can provide the best information as to the status of a pallet. It can provide movement notification on any of the axis, but it can also indicate whether the pallet is in a flat normal usable position or if the pallet is positioned on end or upside down with a non-standard orientation during storage. Using an ultra-low-power high-performance 3-axis accelerometer enables the pallet tracking hardware to operate for long periods of time without consuming significant energy. For example, if the accelerometer is enabled for sensitive detection, and the microcomputer inside the tracker [MCU] supports external notifications, the smart pallet logistics tracker can be awakened upon movement.

A sensitive accelerometer provides significant value to a pallet tracking device. Once the location of a pallet is determined, reported, and recorded in the central tracking system database, the pallet tracker doesn't need to provide any other periodic reports until it is moved. An advantage here is that battery energy consumed while the pallet awaits the next step in the pallet pooling cycle is minimized. Ideally, whether the pallet is at the start of a new cycle, sitting awaiting goods to be placed on the pallet, or the pallet is at the end of the cycle, waiting for the pooling company to retrieve the empty pallet, the tracking device can happily remain in a very low power state. The obvious question remains though . . . is the pallet being effectively used or is it sitting idle because of an over-zealous procurement clerk at the freight origination location or is it sitting idle at the freight destination location, in a stack of other empty pallets awaiting pickup by the pallet pooling company or its agents.

Movement of pallets in the freight destination location must be considered and accounted for in the life of a pooled pallet. Suppose the pallet contains consumer goods and is delivered with the goods to a retail warehouse store. Retail warehouse stores are very popular and include stores such as Costco, Sam's Club, Home Depot, Lowe's, BJ's Wholesale, and Max Club. Once a warehouse store receives the goods on a pallet, many times the pallets are used or incorporated into the display of goods within the warehouse store. It is undesirable to report the location of the pallet every time the moves within the warehouse store. Furthermore, without a pallet empty indication, movement in the warehouse store could account for moving the pallet and contents from an upper pallet shelf to a floor level, or it could account for moving an empty pallet from the floor level display to a pallet storage area.

Location determination for pallets inside of buildings is desirable. In nearly all cases, pallets remain under a roof, unless they are stored outside before they are loaded with goods or after the goods are removed. Pooled pallets are assets with value; somebody is responsible for paying the pooling company for lost pallets. Every pallet rented must be used and retrieved from the destination location or the renting company must eventually compensate the pallet pooling company. For pallets stored in an outdoor location, a pallet tracker needs to be able to receive some type of location information. In a location without a roof, a pallet equipped with a GPS receiver should be able to determine its location. This, however, uses significant energy from the batteries. Another option is to use cell-tower triangulation or any of the location variants including Polte or Cell-ID. While using significantly less energy, the location is not normally as accurate as GPS.

Ideally, if pallets are stored outside of a building at either end of the rental cycle, the building owner will arrange to install a Wi-Fi hotspot or even a non-networked Wi-Fi hotspot. A Wi-Fi hotspot is a location beacon for pallet trackers that have a Wi-Fi receiver. Even a non-connected Wi-Fi hotspot is useful as the MAC address and possibly SSID is broadcast and eventually the MAC/SSID will show up in Wi-Fi location assistance databases. For high volume locations, this can be a requirement from pooling companies to their customers. Using Wi-Fi location assist enables extremely low power location determination, and it also enables Wi-Fi geofencing notifications.

Pallets inside of the building might not be able to receive GPS and must rely on alternative location determination methods. Wi-Fi has become so ubiquitous that nearly every building with a roof also has Wi-Fi inside the building. Wi-Fi locations are extremely accurate due to the short range of the Wi-Fi hotspot transmitter. Perhaps Wi-Fi location is not quite as accurate as a GPS location, but Wi-Fi can provide a very quick, accurate and low-power location, usually to within 30 meters accuracy since the range of the Wi-Fi transmission is usually not much further than 30 meters. Alternatively, appropriately placed stationary Bluetooth Low Energy [BLE] beacons or cell-tower triangulation or any of the cellular location variants including Polte or cell-id, or ultra-wide band is useful inside of buildings.

Another method for determining pallet location is to equip every pallet with a low power transmitter or beacon, like the stationary BLE beacon or a BLE tag similar to Apple's Airtag or Tile BLE tag and have a beacon detection gateway located at every site receiving on the same frequencies as the low power transmitter, looking for the presence of a newly detected signals or BLE beacons, with the pallet id contained in the MAC address or some other field of the BLE Advertisement and reporting the new beacon presence to the pallet management system. The gateway can be connected to the pallet management system directly or through the Internet using physical Ethernet connections, Wi-Fi connections to local hotspots connected to the Internet or using long-range wireless like LTE, 5G or LoRaWAN or similar. Using pallets with beacons and fixed gateways requires every possible location to be equipped with gateways for complete reporting. Location determination for pallet tracking devices is very well known as it is like any other asset location determination.

Storing pallets is subject to careful consideration on both ends of the pooled pallet cycle. Wooden pallets are extremely flammable. They must be stored away from any hazards and must not be stored near any gas or fueling areas. If they are stored indoors, they must be stored in an area where an Early Suppression Fast Response [ESFR] sprinkler system is installed. Wherever the pallets are stored, if they are stacked, they must be stacked on a level surface so that the stack is not unstable and is not at risk of toppling. Unfortunately, many users of pallets are not so familiar with regulations, and they store pallets on end, upside down, and in other orientations instead of perfectly flat. Since pallets with loads are almost always stored in a level location and position, one obvious empty indication is when a pallet is detected in a non-standard orientation.

A successful pallet pooling system where pallets are recycled as quickly as possible is advantageous to all parties, whether the shipper or the receiver. Of course, heavy duty pallets from a pallet pooling system add value to all parties as well, protecting the goods loaded on the pallets, but also protecting the logistics and transport companies moving the freight by eliminating unnecessary damage to the products being transported. A pallet equipped with a multipurpose tracking and locating device adds significant value over and above the pooled pallet. It is very easy to add the sensors for temperature, humidity and vibration to the smart tracking device attached to the pallet, but the most important feature for the pallet pooling system may be missing. Obtaining intelligence whether a pallet is loaded with goods, waiting to be loaded with goods, or unloaded and waiting for retrieval and recovery for the next paying customer, may be desirable.

Figure 2:
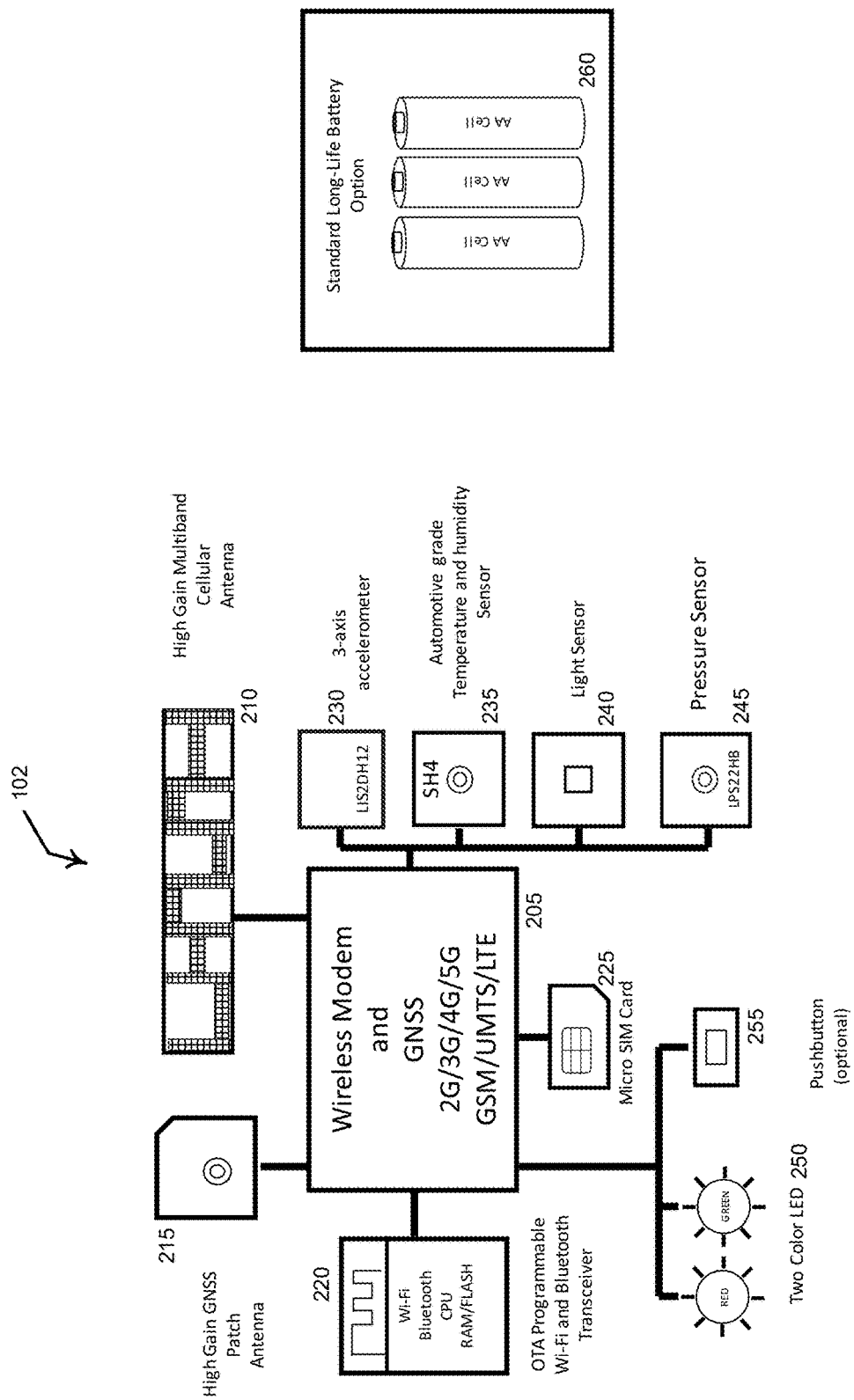
FIG. 2 illustrates a block diagram of components of a tracking device.

Leveraging the low-cost integrated sensors could be key to determining the state of the pallet. A typical pallet tracking device might contain sensors as depicted in FIG. 2. Examining FIG. 2, we see a tracking device equipped with a long-range radio, for example LTE cellular CAT M1 with antenna, a GPS receiver with antenna, a Wi-Fi and Bluetooth (including BLE) transceiver, an accelerometer with at least one axis, but preferably 3-axis, sensitive to the sub 1 G range, preferably a temperature sensor, preferably a humidity sensor, preferably a light sensor and preferably a pressure sensor. The pallet tracking device preferably operates for long periods of time requiring a small amount of power, allowing just a few small batteries to power the device for the lifetime of the pallet to which it is attached.

Sensors such as temperature, humidity, light and pressure add value but are not necessary for a basic smart pallet. Each of these sensors adds value to either the pallet pooling company or the pallet pooling customer. As mentioned earlier, temperature and humidity add significant value to shippers of perishable goods. The pressure sensor may be included to disable the pallet tracker reporting if the pallet is regularly used for air shipments since regulations prohibit radio transmissions from the cargo of an aircraft while it is airborne. The accelerometer has multiple use cases including determining that the goods being carried by the pallet are exposed to extreme vibration, impacts or shocks that may damage the goods being carried by the pallets.

The accelerometer is useful for a pallet pooling company smart tracking device. A sensitive accelerometer can detect movement causing the communication system to report locations to the pallet pooling company's management system and subsequently to the customer's logistics management system, selectively using movement conditions. As an example, while the pallet is in the pooling company's distribution center, as determined by location or other factors such as a known Wi-Fi hotspot MAC address or SSID, movement could signal the pallet to connect using the communication system and upload new customer specific profiles. Movement could signal to the pallet that it is being loaded on a truck for delivery to a freight originating location, or movement could just mean that the pallet is being relocated within the pallet pooling company's distribution center or warehouse.

Steady and continuous and extended time length movement could indicate that the pallet is actively being relocated. It may be transporting goods, or it may be part of a delivery to a freight originating location, or it could be being transported from a freight destination location back to the pooling company's distribution center. Knowing the state of the pallet and whether it is carrying goods is very important for pallet pooling company and the pallet pooling company's customers.

Figure 11:
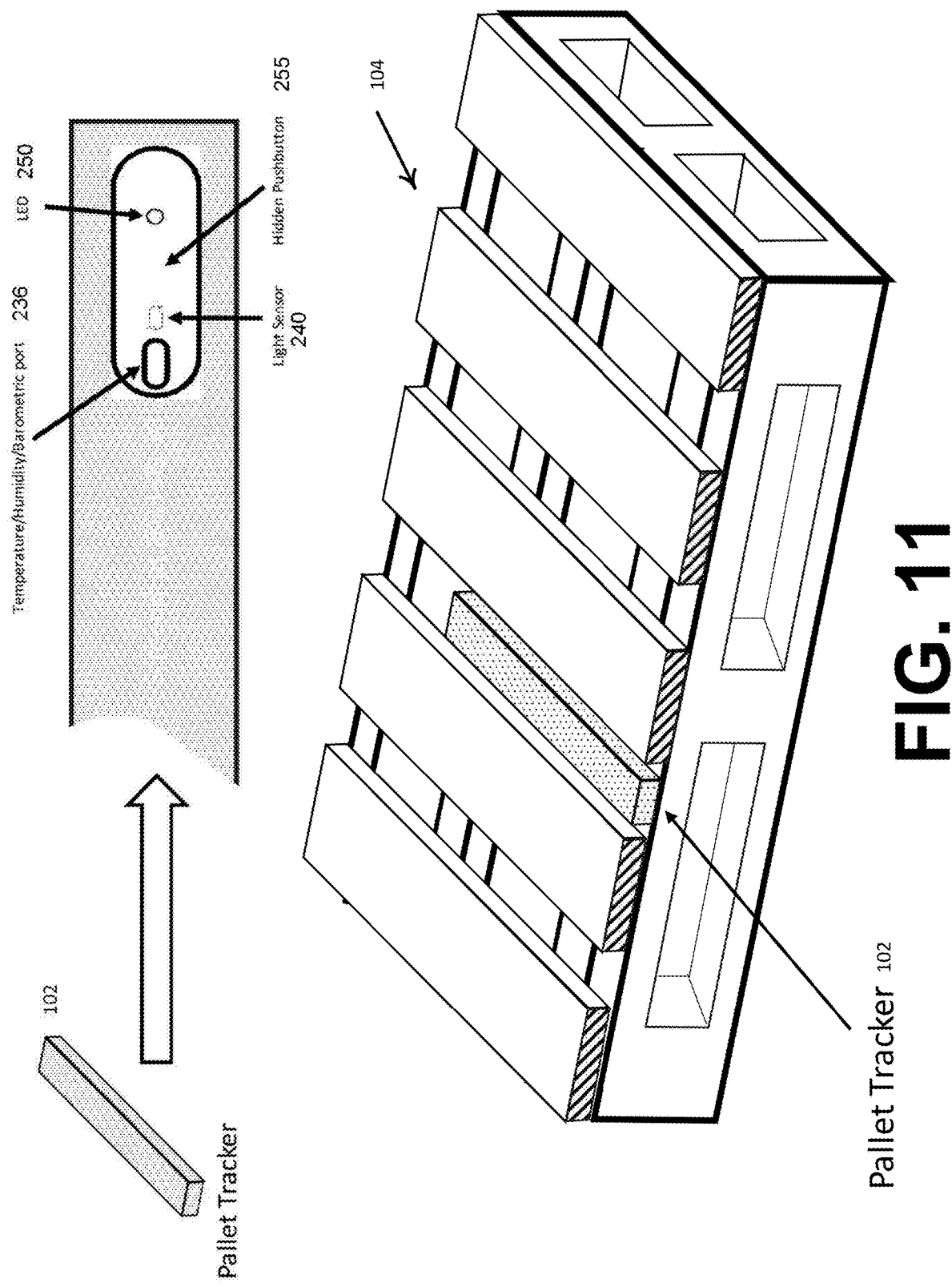
FIG. 11 illustrates a bar-style tracking device inserted between slats of a pallet.

There are many ways to determine whether a pallet is loaded. It is possible to equip a pallet with load cells that detect weight on a pallet above a certain level. Load cells are force transducers that generate electronic signals proportional to forces such as tension, compression, compression, pressure, and torque. Load cells have been used for many applications involving weight and are very well understood. Load cells may not be practical to install in pallets due to the cost and complexity of the installation. One method of using a load cell might be to place the pallet tracking device between deckboards that provide the surface of the pallet. FIG. 11 shows a typical pallet with a pallet tracker installed between deckboards. The pallet tracker could have a very small protrusion. The protrusion could be a sensor that is not depressed when the pallets are normally stacked but one or more of the sensors could be arranged to detect a load on the pallet.

Another way to detect the presence of a load on a pallet is to use a light sensor on the pallet tracker that detects varying levels of light, reporting a value that ranges from no light to high levels of light. Depending on the placement of the sensor, one or more optimally placed light sensors could detect the presence of a typical load and able to detect no load when the pallets are stacked normally. Light sensors would depend on the pallets being stored in a lighted room. However, if managed properly, a light sensor can be used as a triggering event, and a continuous "loaded" signal is not required. For example, once a loaded pallet arrives at the destination, as determined by the detection of the destination location using any of the methods previously described to determine location, if the light sensor becomes exposed, the pallet remembers that condition . . . the pallet has at least been unloaded once, and reports that condition to the pallet pooling company's management server and potentially forwards that bit of information to the freight shipper as well. Of course, the light sensor has limitations. If odd-shaped goods, transparent goods or partially loaded pallets are transported, the light sensor might be fooled into believing that it is unloaded. The placement of the tracker and the orientation of the light sensor might be critical for certain goods.

Another way to detect the presence of a load on a pallet is to store empty pallets in a very specific location which is detectable by the electronics on the smart pallet. Given the sensors on the pallet, one could store the pallet in a location where the temperature or humidity are unique. Although not practical or desirable, the pallets could be stored at a certain temperature, say above 70° Fahrenheit for goods that must be refrigerated below a certain temperature, say 40° Fahrenheit. Although this works for refrigerated goods, pooled pallets may have multiple uses and they may not always be used for refrigerated goods. Another method might be to store the pallets outside. The temperature sensor could be checked multiple times, perhaps 4 to 6 times per day. Diurnal temperature variation could signify that the pallet is no longer located in a typical warehouse with a fairly fixed temperature. Depending on humidity, outside air temperature can vary as much as 50° Fahrenheit from day to night, to as little as about 8° Fahrenheit. High desert (dry) climates have the greatest diurnal-temperature variations while low-lying humid areas have the least. With a combination temperature and humidity detector, a pallet stored outside can indicate to a pooling company that is either waiting on a load of goods or the goods have been unloaded and it is available for retrieval and recycling. This method would be useful for pallets that are stored outside, but probably would not be useful for pallets stored in a warehouse.

Figure 14:
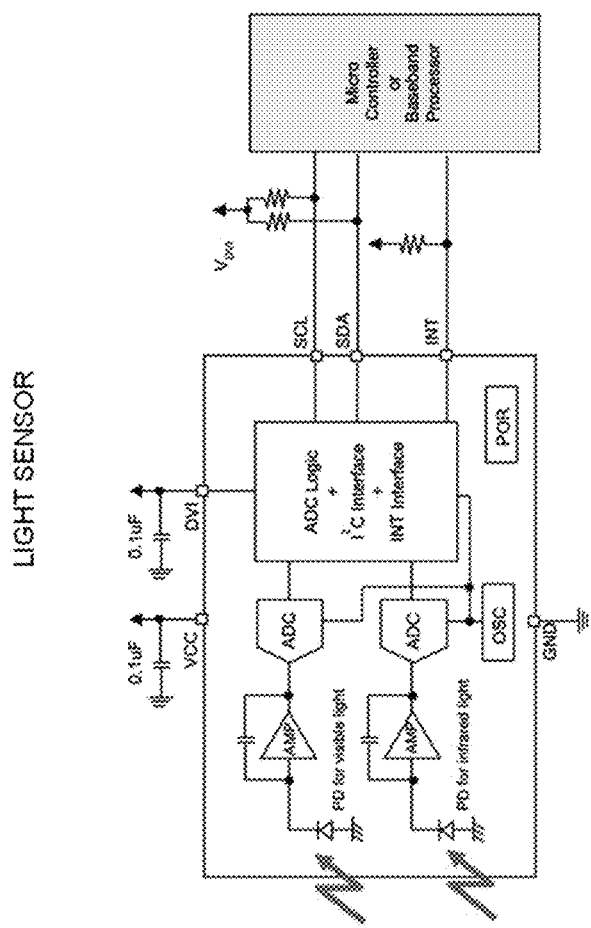
FIG. 14 illustrates a schematic diagram of a light sensor.

With the correct light sensor, a pallet can have an optimally placed light sensor that picks up light, regardless of the load condition. Although detecting light by itself is not useful information, most light sensors can discretely detect visible light and infrared light. FIG. 14 shows a typical block diagram of low-cost sensor that supports light detection for both visible light and infrared light. The light in the range of 600 nanometers registers as visible light while light in the range of 825 nanometers registers as Infrared light. Such light sensors commonly are very sensitive and provide 16-bit values for the range of light from complete darkness to bright lights, with typical room conditions somewhere in the middle. Such light sensors draw very little power and provide MCU signals or interrupts when thresholds or conditions change. Such light sensors typically have configuration registers that permit setting those thresholds and conditions.

Since different light conditions may trigger the light sensor, different thresholds may need to be set. For example, sunlight may trigger both sensors. Empty pallets may be stored in different location, some in the shade of a protective awning and some stored in direct sunlight. Therefore, it is desirable for the pallet tracker electronics to have a mechanism to adjust the sensitivity based on a longer term rather than just instant in time. The empty pallets could be moved to the storage yard in darkness and when the sun rises in the morning, an instantaneous alert or notification might be flawed. Ideally, if light is used as a trigger, advanced solutions can assist in the pallet unloaded condition. For example, if the pallet knows that it is in a certain location, its unloaded alert can be preconfigured to alert based on temperature or varying light. Further, if the pallet has an infrared sensor, a special infrared notification light might illuminate the empty pallets in a storage room that might not otherwise have infrared exposure like sunlight.

Another option is to "broadcast" using infrared lights installed nearby but illuminating the pallets, whether indoors or outdoors. Infrared light is harmless and can provide coded signals much like television remote controls control the channels. Sending a coded signal that triggers the light sensor can alert the MCU that the pallet is being stored in a location that would normally be used just for storing empty pallets. Typical light sensors, providing interrupt signals to the MCU can wake-up an MCU that is otherwise in an extremely low power condition so that the MCU can alert the pallet pooling company's management system that the pallet may be retrieved and recycled. Although the "broadcast" infrared solution is reliable, and coding infrared signals is very well understood, it requires an extra step of installing specific equipment at a customer's location. This may be easy for freight originating companies who ship a high volume of goods on pallets, it might not be desirable for lower volume shippers. It might be too expensive.

Bluetooth and Wi-Fi transmitters, otherwise known as beacons and hotspots are another way to alert pallet electronics that the pallet is being stored empty. Bluetooth Low Energy beacons and Wi-Fi hotspots can be placed near the storage area for empty pallets. The BLE beacon can be coded to indicate different things, including the exact location and whether the area is a storage area or a warehouse retail store environment where goods are stored on the pallets. Many of the large warehouse stores have hundreds or thousands of pallets that are filled with goods, but the pallets are used as part of the shelving, and it would be undesirable for the pallet pooling company to try to retrieve pallets that are still being used. BLE beacons and Wi-Fi hotspots can go a long way to informing the pallet pooling company's management system that empty pallets are available for retrieval. Warehouse retail stores can have special exception notes in their location register in the management system that indicate to the pallet pooling company that pallets are used on site for retail displays.

All these methods have significant value for most, but not all conditions that indicate whether a pallet is empty or whether it is loaded with goods. The ideal answer is a combination of these sensor inputs, but there is another method that might be better than all the others.

If the pallet electronics are equipped with a sensitive accelerometer with at least one axis aligned with gravity, then movements can be detected. But more importantly, with a properly installed sensitive accelerometer that can be read at about 40 samples per second and sub-one-G values, the load condition of a pallet can be accurately determined.

It is not critical for embodiments disclosed herein to have a perfectly installed and aligned accelerometer if a 3-axis accelerometer is installed because it is possible to calculate accurate Z-axis vector acceleration values if the accelerometer is calibrated by Earth's gravity. Calibration may involve placing the pallet on a perfectly level surface that calculates any variations to level based on reading each of the "G" values on the X, Y and Z axis. Since the Earth exhibits a roughly 1-G value on the true Z-axis of the pallet and device, each axis can be used in calculation of the Z-axis values regardless of the orientation of the accelerometer with respect to the pallet and the device. Tilting the actual accelerometer can cause Earth's gravity to affect all the axis of the accelerometer and it is possible that none of the axis read will solely reflect Earth's one-G affect. A simple formula:

$$A=\sqrt{X^2+Y^2+Z^2} \qquad \text{Eq. 1}$$

Where "A" is the total acceleration on the system, and X, Y and Z represent the acceleration values of each of the three axes. If there is no acceleration on any axis, except the effect of gravity then the value of "A" may be 1. The accelerometer can be oriented at any angle, with any of the three axes aligned with gravity, or not, and the overall device output remains the same. The calculation for movement and MCU interrupts is easier if one of the three axes are aligned with Earth's gravity. It will be appreciated that even if an axis of an accelerometer of a tracking device is not aligned with the direction of gravity, combining outputs from three axes of a three-axis accelerometer may nevertheless provide acceleration values that are useful for embodiments described herein.

A pallet with a smart tracking device including an accelerometer may experience many forces daily, especially when loaded with goods and being carried in the back of a transport vehicle. Potholes, curbs, and other typical bumps of a roadway may cause the pallet to be exposed to shocks and other movements that could cause false indications. However, when combined with a known location using the various location sensors that are part of the smart tracking device, it is possible to know with near certainty that the pallet is in a freight origination facility or a freight destination facility and whether it is empty or not. If the smart tracking device accelerometer detects near continuous movement, for an extended period, perhaps longer than 5 or 10 minutes, then it is unlikely that it is inside a facility where it may be loaded or unloaded. If the smart tracking device detects a Wi-Fi hotspot of a potential origination or destination facility, then the pallet is likely inside that facility and is not being transported where it may experience unusual forces indicative of the normal movement between facilities. It is possible to pre-enable the smart tracking device with the known Wi-Fi hotspot, BLE beacon or other low-power RF beacon or infrared light corresponding to a receiver on the smart tracking device.

A pallet will most likely experience some movement both before loading and unloading. It is possible, but very unlikely that a freight origination company or freight destination company would position the pallet one time, load or unload the goods on the pallet and leave the pallet sitting exactly where it was originally positioned. Normally, if the pallet is being loaded, it is moved to a queuing point, maybe a loading dock. Pallets may be used because they facilitate convenient loading and securing of goods in a single shipping unit. The goods are secured, and the pallet is ready for shipment. At a receiving end, pallets are typically received and moved to an unloading area. In warehouse retail stores, a pallet may be moved to the lower level of a display/warehouse rack, or the pallet may be stored on upper levels until the lower-level products have been stored. If the pallet is use for transportation only, and the delivery destination promptly unloads the pallet, the empty pallets are typically stacked in an acceptable empty pallet area, usually with the aid of a forklift or pallet jack.

When a pallet is moved, it is typically raised from the floor at least a few inches, whether the pallet is loaded or not. Picking up a load, no matter how gently, exposes the pallet, a potential load corresponding to the pallet, and smart pallet electronics containing the accelerometer to detectable movements on a sensitive accelerometer. Lifting a load very gently may only expose the accelerometer to true Z-axis acceleration that may be small, but detectible, in magnitude. Setting a load down on the floor, no matter how gently also exposes the accelerometer to detectable Z-axis acceleration.

It is impossible to know, in advance, how good a forklift driver is at a given facility. Some are better than others and years of experience for forklift operators enables them to move pallets very quickly and gently. Especially forklift drivers who regularly move fragile goods. Even the very best forklift drivers can't escape the laws of physics and the laws of gravity. Moving a pallet will cause the pallet and its contents to be exposed to some accelerations that are not just the 1.0 G force from gravity. If we monitor the Z-axis forces, we can tell when a pallet is lifted from the ground, and we can tell when the pallet is returned to the ground during movement. Any object moving upwards will experience more that 1.0 G when it is moved upwards and less than 1.0 G when it is lowered back to the ground. When the pallet is lowered back to the ground, eventually the pallet will hit the ground and its downward movement will cease. The forces acting on the pallet are the same, whether the pallet is empty or full. At some point the downward movement will stop. Unless the pallet is placed on a soft surface, or a surface that 'gives' according to weight applied, a full pallet and an empty pallet will stop at the same place.

One observed difference is the motion of a pallet placed on a surface. Although two pallets may stop when reaching a surface, such as a floor, when a pallet is loaded with a weight, even a fraction of the pallet's weight carrying capacity, the pallet will settle much quicker on the surface if the weight is higher than if the pallet is empty. It has been observed that varying the weight/load varies the speed at which the pallet settles to the surface and movement ceases. Observations have shown that an empty pallet has significantly more detectable micromotions or bounce than a pallet loaded with 50 pounds of material. Not only are the micromotions, or bouncing motions, much lower, the motions and bounce get to a point where they become undetectable much quicker for a loaded pallet. Testing on a hard concrete floor and testing on a softer sawdust bed covering compressed soil generated similar results. Therefore, because pallets are typically set down on concrete or hard wood surfaces, or even hard soil surfaces, test results corresponding to the soft sawdust/soil surface are not provided herein.

Turning now to FIG. 1, the illustrates environment 100 with tracking device 102 fixed to, attached to, insert into, or otherwise corresponding to pallet 104. Tracking device 102 and the user equipment 115, for example a smartphone, may communicate with a radio access network node 105 via long range wireless communication links 125. Radio access network node 105 may communicate with a communication network 130 via communication links 120. Tracking/management server 140 may receive messages generated by tracking device 102 or messages generated by user equipment 115 directed to the server. Server 140 may direct messages to tracking device 102 requesting data or information corresponding thereto. Tracking device 102 and user equipment 115 may communicate via short range wireless communication links 135.

Turning now to FIG. 2, the figure illustrates a block diagram of components that may compose, or make up, tracking device 102. Tracking device 102 may comprise a wireless communication processor 205, which may facilitate wireless communication with radio access network node 105 via long range wireless communication links 125 shown in FIG. 1. Processor 205 may be referred to as a computing device, or tracking device 102 as a whole may be referred to as a computing device. Tracking device 102 may comprise components coupled to processor 205 such as cellular antenna 210 that may facilitate transmitting or receiving signals with respect to radio access network node 105 via long range communication links 125. Tracking device 102 may comprise GPS antenna 215 that may facilitate receiving satellite signals that may be used by processor 205 to determine location coordinates corresponding to the tracking device. Tracking device 102 may comprise programmable short range wireless communication transceiver/module 220 that may facilitate communication with user equipment 115 via short range communication wireless links 135, which may comprise wireless links that facilitate sidelink, Bluetooth, Wi-Fi, Wi-gig, or similar short range wireless technologies. Tracking device 102 may comprise subscriber identity module information 225. Subscriber identity module 225 may be in the form of, or contained in, a SIM card, an eSIM, a soft SIM, or subscriber identity information that is securely stored in a memory of the tracking device.

Tracking device 102 may comprise sensors coupled to processor 205, for example accelerometer 230. Tracking device 102 may comprise environment sensor 235 that may measure temperature, barometric pressure, or humidity. Tracking device 102 may comprise light sensor 240 or pressure sensor 245, which may comprise a strain gauge. Tracking device 102 may comprise indicator lights 250 or tactile input devices, for example push buttons 255. Tracking device 102 may comprise a power source, for example a battery 260, or battery module, which may provide power to other components of the tracking device.

Empty Pallet Data Collection on Z-Axis

Table 1 shows data collected from a 16-G Accelerometer, (e.g., accelerometer 230), corresponding to an axis of the accelerometer aligned with a Z-Axis in free space at 40 samples per second. The accelerometer was installed in a tracking device, such as tracking device 102, which was affixed to an unladen pallet, such as pallet 104, as described elsewhere herein. Data presented in Table 1 is presented graphically in FIG. 3 with the first column of Table 1 comprising Z-Axis accelerometer readings with 1.000000 G representative of acceleration due to Earth's gravity. Thus, data in the second data column (e.g., ABS column) comprises an absolute value of 1 minus the corresponding Z-axis value from column 1 (e.g., |1-Z-axis value|) to remove the effects of gravity from the data. It will be appreciated that minor error may be associated with output values of accelerometer 230. During testing that resulted in the data shown in Table 1, movement on any axis greater than 0.005 G was a trigger to collect and store Z-axis acceleration values until 1 second after cessation of movement by the accelerometer. Ninety-eight samples are shown in Table 1, with forty samples occurring after the last sample labeled as High Relative acceleration. Thus, cessation of movement is indicated by the last sample labeled as High Relative acceleration.

Samples in Table 1 are labeled as minimal acceleration when the absolute value of the measured acceleration of the tracking device, less the effects of gravity, is about 2% to 3% of gravity (e.g., the ABS value is about 0.02 G to 0.03 G). The data sample values labeled High Relative acceleration in Table 1 correspond to the unladen pallet, to which the tracking device was affixed, being set down on a concrete floor. The terminology 'High Relative' is used to indicate acceleration values corresponding to the unladen pallet contacting the concrete floor relative to sample acceleration values during a period before contact with the concrete floor and relative to sample acceleration values during a period after movement of the unladen pallet, due to contact with the concrete floor, has ceased. The accelerometer generated 23 samples from the first sample value that exhibited a High Relative acceleration to the last sample that exhibited a High Relative acceleration value. It will be appreciated that one of the 23 samples is labeled as minimal acceleration, which is attributed to acceleration acting on the accelerometer being equal to, or almost equal to acceleration due to gravity as the unladen pallet was in freefall during bouncing. After cessation of movement of the unladen pallet (e.g., after bouncing of the unladen packet ceased), accelerates returned to values corresponding to acceleration due to gravity only. A sum of the 23 sample Z-axis acceleration values during contact and bouncing is about 25.213.

TABLE 1

| Z-Axis Value | => | ABS (1 − Z-Axis Value) | |
|---|---|---|---|
| 1.024536 | => | 0.024536 | Minimal acceleration |
| 1.025879 | => | 0.025879 | Minimal acceleration |
| 1.023926 | => | 0.023926 | Minimal acceleration |
| 1.023438 | => | 0.023438 | Minimal acceleration |
| 1.023193 | => | 0.023193 | Minimal acceleration |
| 1.022583 | => | 0.022583 | Minimal acceleration |
| 1.024292 | => | 0.024292 | Minimal acceleration |
| 1.024048 | => | 0.024048 | Minimal acceleration |
| 1.02356 | => | 0.02356 | Minimal acceleration |
| 1.024414 | => | 0.024414 | Minimal acceleration |
| 1.02356 | => | 0.02356 | Minimal acceleration |
| 1.023438 | => | 0.023438 | Minimal acceleration |
| 1.02417 | => | 0.02417 | Minimal acceleration |
| 1.024536 | => | 0.024536 | Minimal acceleration |
| 1.023193 | => | 0.023193 | Minimal acceleration |
| 1.024048 | => | 0.024048 | Minimal acceleration |
| 1.02417 | => | 0.02417 | Minimal acceleration |
| 1.02417 | => | 0.02417 | Minimal acceleration |
| 1.024292 | => | 0.024292 | Minimal acceleration |
| 1.024536 | => | 0.024536 | Minimal acceleration |
| 1.023926 | => | 0.023926 | Minimal acceleration |
| 1.02356 | => | 0.02356 | Minimal acceleration |
| 1.024048 | => | 0.024048 | Minimal acceleration |
| 1.023926 | => | 0.023926 | Minimal acceleration |
| 1.024658 | => | 0.024658 | Minimal acceleration |
| 1.024048 | => | 0.024048 | Minimal acceleration |
| 1.023071 | => | 0.023071 | Minimal acceleration |
| 1.024048 | => | 0.024048 | Minimal acceleration |
| 1.022949 | => | 0.022949 | Minimal acceleration |
| 1.02417 | => | 0.02417 | Minimal acceleration |
| 1.025146 | => | 0.025146 | Minimal acceleration |
| 1.024902 | => | 0.024902 | Minimal acceleration |

TABLE 1-continued

Z-Axis Value => ABS
(1 − Z-Axis Value)

| | | | |
|---|---|---|---|
| 1.024414 | => | 0.024414 | Minimal acceleration |
| 1.026245 | => | 0.026245 | Minimal acceleration |
| 0.166748 | => | 0.833252 | High Relative Acceleration |
| 3.567627 | => | 2.567627 | High Relative Acceleration |
| −0.715942 | => | 1.715942 | High Relative Acceleration |
| −0.20166 | => | 1.20166 | High Relative Acceleration |
| −0.385132 | => | 1.385132 | High Relative Acceleration |
| 0.459717 | => | 0.540283 | High Relative Acceleration |
| 1.856323 | => | 0.856323 | High Relative Acceleration |
| 3.022339 | => | 2.022339 | High Relative Acceleration |
| −1.53833 | => | 2.53833 | High Relative Acceleration |
| 3.569946 | => | 2.569946 | High Relative Acceleration |
| −0.209106 | => | 1.209106 | High Relative Acceleration |
| 1.240723 | => | 0.240723 | High Relative Acceleration |
| 1.230469 | => | 0.230469 | High Relative Acceleration |
| 0.998047 | => | 0.001953 | Minimal Acceleration |
| 0.827393 | => | 0.172607 | High Relative Acceleration |
| 1.316528 | => | 0.316528 | High Relative Acceleration |
| 0.545898 | => | 0.454102 | High Relative Acceleration |
| 2.143066 | => | 1.143066 | High Relative Acceleration |
| 1.123291 | => | 0.123291 | High Relative Acceleration |
| 2.44812 | => | 1.44812 | High Relative Acceleration |
| 1.490723 | => | 0.490723 | High Relative Acceleration |
| 0.888062 | => | 0.111938 | High Relative Acceleration |
| 1.298706 | => | 0.298706 | High Relative Acceleration |
| 0.967407 | => | 0.032593 | Minimal acceleration |
| 0.955322 | => | 0.044678 | Minimal acceleration |
| 0.93811 | => | 0.06189 | Minimal acceleration |
| 0.876587 | => | 0.123413 | Minimal acceleration |
| 1.169556 | => | 0.169556 | Minimal acceleration |
| 0.968018 | => | 0.031982 | Minimal acceleration |
| 0.898071 | => | 0.101929 | Minimal acceleration |
| 1.024902 | => | 0.024902 | Minimal acceleration |
| 1.047852 | => | 0.047852 | Minimal acceleration |
| 1.038696 | => | 0.038696 | Minimal acceleration |
| 0.935303 | => | 0.064697 | Minimal acceleration |
| 0.923218 | => | 0.076782 | Minimal acceleration |
| 1.084229 | => | 0.084229 | Minimal acceleration |
| 1.105957 | => | 0.105957 | Minimal acceleration |
| 0.902344 | => | 0.097656 | Minimal acceleration |
| 1.046509 | => | 0.046509 | Minimal acceleration |
| 1.097778 | => | 0.097778 | Minimal acceleration |
| 0.949829 | => | 0.050171 | Minimal acceleration |
| 0.989014 | => | 0.010986 | Minimal acceleration |
| 1.043213 | => | 0.043213 | Minimal acceleration |
| 1.065552 | => | 0.065552 | Minimal acceleration |
| 0.998291 | => | 0.001709 | Minimal acceleration |
| 0.999634 | => | 0.000366 | Minimal acceleration |
| 1.05896 | => | 0.05896 | Minimal acceleration |
| 1.030273 | => | 0.030273 | Minimal acceleration |
| 0.989502 | => | 0.010498 | Minimal acceleration |
| 1.05481 | => | 0.05481 | Minimal acceleration |
| 1.050781 | => | 0.050781 | Minimal acceleration |
| 0.998657 | => | 0.001343 | Minimal acceleration |
| 1.018188 | => | 0.018188 | Minimal acceleration |
| 1.05249 | => | 0.05249 | Minimal acceleration |
| 1.037842 | => | 0.037842 | Minimal acceleration |
| 0.999634 | => | 0.000366 | Minimal acceleration |
| 1.030884 | => | 0.030884 | Minimal acceleration |
| 1.045898 | => | 0.045898 | Minimal acceleration |
| 1.005005 | => | 0.005005 | Minimal acceleration |
| 1.019653 | => | 0.019653 | Minimal acceleration |
| 1.03894 | => | 0.03894 | Minimal acceleration |
| 1.029663 | => | 0.029663 | Minimal acceleration |
| 1.013306 | => | 0.013306 | Minimal acceleration |

Collection of Pallet Data Along Z-Axis 50 Pounds of Load on the Pallet

Figure 4:
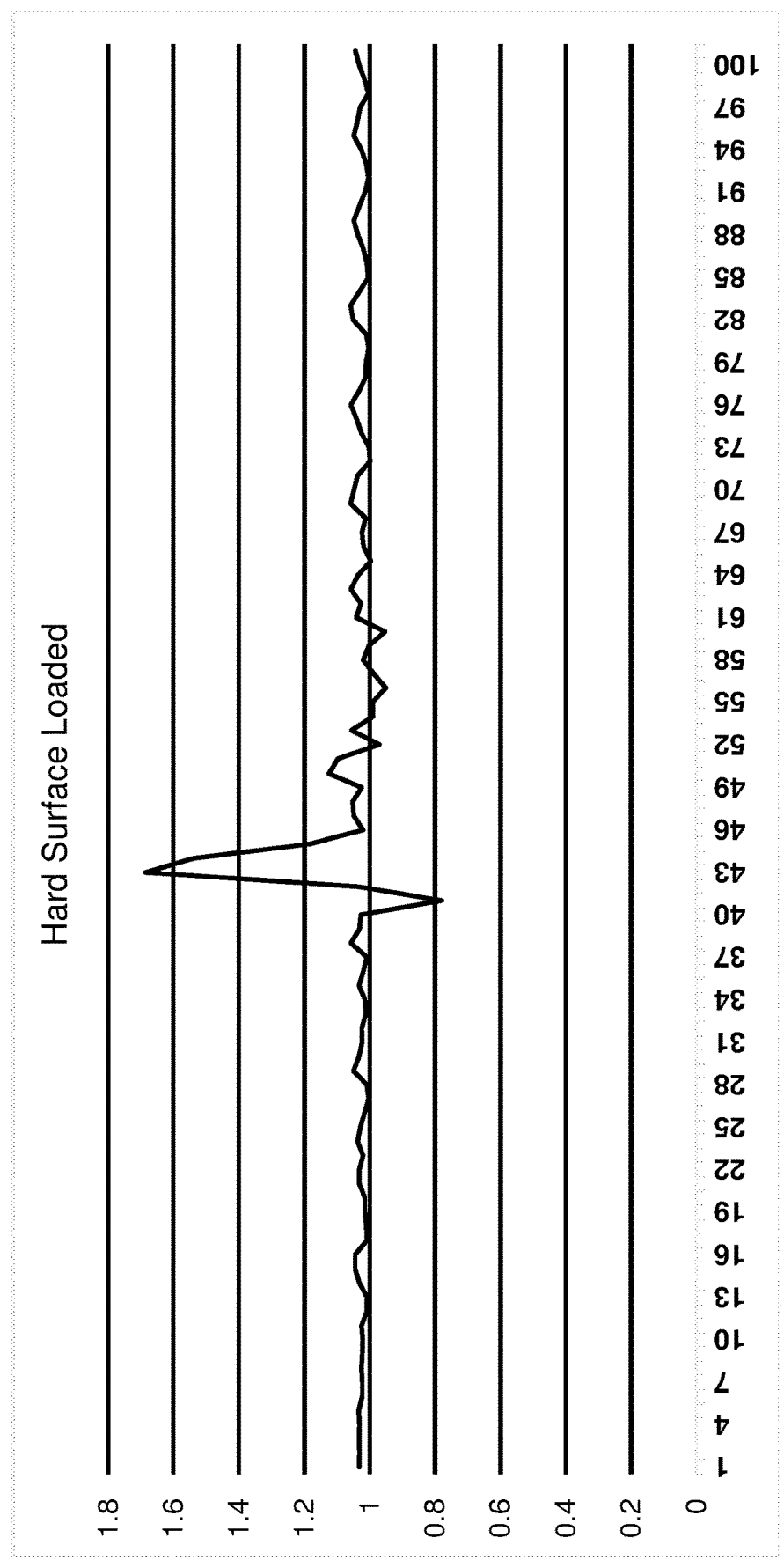
FIG. 4 illustrates a graph of acceleration value samples acquired by a tracking device attached to a laden pallet.

Table 2 comprises data collected at the same 40 samples per second and with the same accelerometer/tracking device setup as used to collect the data shown in Table 1, but with the pallet laden with 50 lbs. of load. Data presented in Table 2 is shown in graphical form in FIG. 4. Placing the laden pallet on the concrete floor resulted in an indication of High Relative acceleration when the laden pallet contacted the concrete floor but with very little, if any, bouncing as indicated by only to other data samples labeled as High Relative acceleration in Table 2. Since Table 2 comprises only three samples labeled as High Relative acceleration, a sum of Z-Axis movement corresponding to placing the laden pallet on the concrete floor is about 4.3901, which is much lower than the 25.213 sum of the 23 High Relative acceleration values corresponding to the unladen pallet data shown in Table 1.

TABLE 2

Z-Axis Value => ABS
(1 − Z-Axis Value)

| | | | |
|---|---|---|---|
| 1.032227 | => | 0.032227 | Minimal acceleration |
| 1.030518 | => | 0.030518 | Minimal acceleration |
| 1.032227 | => | 0.032227 | Minimal acceleration |
| 1.031372 | => | 0.031372 | Minimal acceleration |
| 1.033813 | => | 0.033813 | Minimal acceleration |
| 1.022461 | => | 0.022461 | Minimal acceleration |
| 1.022705 | => | 0.022705 | Minimal acceleration |
| 1.025269 | => | 0.025269 | Minimal acceleration |
| 1.022949 | => | 0.022949 | Minimal acceleration |
| 1.021729 | => | 0.021729 | Minimal acceleration |
| 1.025757 | => | 0.025757 | Minimal acceleration |
| 1.009033 | => | 0.009033 | Minimal acceleration |
| 1.008179 | => | 0.008179 | Minimal acceleration |
| 1.031006 | => | 0.031006 | Minimal acceleration |
| 1.043945 | => | 0.043945 | Minimal acceleration |
| 1.044189 | => | 0.044189 | Minimal acceleration |
| 1.008057 | => | 0.008057 | Minimal acceleration |
| 1.01001 | => | 0.01001 | Minimal acceleration |
| 1.01416 | => | 0.01416 | Minimal acceleration |
| 1.014771 | => | 0.014771 | Minimal acceleration |
| 1.032104 | => | 0.032104 | Minimal acceleration |
| 1.032349 | => | 0.032349 | Minimal acceleration |
| 1.020264 | => | 0.020264 | Minimal acceleration |
| 1.037231 | => | 0.037231 | Minimal acceleration |
| 1.029297 | => | 0.029297 | Minimal acceleration |
| 1.016724 | => | 0.016724 | Minimal acceleration |
| 1.002441 | => | 0.002441 | Minimal acceleration |
| 1.009399 | => | 0.009399 | Minimal acceleration |
| 1.049438 | => | 0.049438 | Minimal acceleration |
| 1.032471 | => | 0.032471 | Minimal acceleration |
| 1.023926 | => | 0.023926 | Minimal acceleration |
| 1.024902 | => | 0.024902 | Minimal acceleration |
| 1.012451 | => | 0.012451 | Minimal acceleration |
| 1.014771 | => | 0.014771 | Minimal acceleration |
| 1.032959 | => | 0.032959 | Minimal acceleration |
| 1.019897 | => | 0.019897 | Minimal acceleration |
| 1.009155 | => | 0.009155 | Minimal acceleration |
| 1.057983 | => | 0.057983 | Minimal acceleration |
| 1.031006 | => | 0.031006 | Minimal acceleration |
| 1.026855 | => | 0.026855 | Minimal acceleration |
| 0.77832 | => | 0.22168 | Minimal acceleration |
| 1.037354 | => | 0.037354 | Minimal acceleration |
| 1.686646 | => | 0.686646 | High Relative acceleration |
| 1.536621 | => | 0.536621 | High Relative acceleration |
| 1.184814 | => | 0.184814 | High Relative acceleration |
| 1.02063 | => | 0.02063 | Minimal acceleration |
| 1.04834 | => | 0.04834 | Minimal acceleration |
| 1.051392 | => | 0.051392 | Minimal acceleration |
| 1.02417 | => | 0.02417 | Minimal acceleration |
| 1.125488 | => | 0.125488 | Minimal acceleration |
| 1.097412 | => | 0.097412 | Minimal acceleration |
| 0.96936 | => | 0.03064 | Minimal acceleration |
| 1.055298 | => | 0.055298 | Minimal acceleration |
| 0.989258 | => | 0.010742 | Minimal acceleration |
| 0.991211 | => | 0.008789 | Minimal acceleration |
| 0.95105 | => | 0.04895 | Minimal acceleration |
| 0.985962 | => | 0.014038 | Minimal acceleration |
| 1.020874 | => | 0.020874 | Minimal acceleration |
| 1.002319 | => | 0.002319 | Minimal acceleration |
| 0.953247 | => | 0.046753 | Minimal acceleration |
| 1.041382 | => | 0.041382 | Minimal acceleration |
| 1.027222 | => | 0.027222 | Minimal acceleration |
| 1.057617 | => | 0.057617 | Minimal acceleration |
| 1.035034 | => | 0.035034 | Minimal acceleration |
| 0.99707 | => | 0.00293 | Minimal acceleration |

TABLE 2-continued

Z-Axis Value => ABS
(1 − Z-Axis Value)

| | | | |
|---|---|---|---|
| 1.018311 | => | 0.018311 | Minimal acceleration |
| 1.023193 | => | 0.023193 | Minimal acceleration |
| 1.013184 | => | 0.013184 | Minimal acceleration |
| 1.058716 | => | 0.058716 | Minimal acceleration |
| 1.047974 | => | 0.047974 | Minimal acceleration |
| 1.037354 | => | 0.037354 | Minimal acceleration |
| 0.998535 | => | 0.001465 | Minimal acceleration |
| 1.001709 | => | 0.001709 | Minimal acceleration |
| 1.025879 | => | 0.025879 | Minimal acceleration |
| 1.040405 | => | 0.040405 | Minimal acceleration |
| 1.058228 | => | 0.058228 | Minimal acceleration |
| 1.032104 | => | 0.032104 | Minimal acceleration |
| 1.012329 | => | 0.012329 | Minimal acceleration |
| 1.011353 | => | 0.011353 | Minimal acceleration |
| 1.003174 | => | 0.003174 | Minimal acceleration |
| 1.009644 | => | 0.009644 | Minimal acceleration |
| 1.050415 | => | 0.050415 | Minimal acceleration |
| 1.059204 | => | 0.059204 | Minimal acceleration |
| 1.032227 | => | 0.032227 | Minimal acceleration |
| 1.004761 | => | 0.004761 | Minimal acceleration |
| 1.008789 | => | 0.008789 | Minimal acceleration |
| 1.019775 | => | 0.019775 | Minimal acceleration |
| 1.035645 | => | 0.035645 | Minimal acceleration |
| 1.04834 | => | 0.04834 | Minimal acceleration |
| 1.031616 | => | 0.031616 | Minimal acceleration |
| 1.014404 | => | 0.014404 | Minimal acceleration |
| 1.004395 | => | 0.004395 | Minimal acceleration |
| 1.009766 | => | 0.009766 | Minimal acceleration |
| 1.025757 | => | 0.025757 | Minimal acceleration |
| 1.048828 | => | 0.048828 | Minimal acceleration |
| 1.038574 | => | 0.038574 | Minimal acceleration |
| 1.030273 | => | 0.030273 | Minimal acceleration |
| 1.004272 | => | 0.004272 | Minimal acceleration |
| 1.015991 | => | 0.015991 | Minimal acceleration |
| 1.032104 | => | 0.032104 | Minimal acceleration |
| 1.042847 | => | 0.042847 | Minimal acceleration |

Based on the data presented in Table 1 and Table 2, it is observed that a tracking device, comprising an accelerometer, affixed to a pallet may facilitate generating electronic movement indications that are indicative that a pallet is laden or unladen. Furthermore, data, such as data presented in Table 1 and Table 2, may be useful in determining a criterion that may be used to configure a tracking device with a movement criterion that may facilitate the tracking device in determining an unladen indication indicative that the tracking device corresponds to an unladen transportation asset. For example, based on the data presented in Table 2, a criterion, which may be referred to as a movement criterion, may be three acceleration values, corresponding to three respective sample times, generated by an accelerometer of a tracking device exceeding a magnitude threshold. The magnitude threshold may be a configured acceleration value, for example, 0.1 G. In an embodiment, a movement criterion may be a sum of measured acceleration sample values, where in each sample value exceeds a threshold. Thus, in reference to data presented in Table 1 and Table 2, if a movement criterion for determining that a pallet, with a tracking device affixed, that has been placed on a floor, for example by a forklift, is unladen is more than three accelerometer samples exceeding an acceleration threshold of 0.1 G, the placing the pallet laden with 50 pounds that resulted in the data presented in Table 2 would not result in an indication that the pallet is unladen because only three samples presented in Table 2 are labeled as high relative acceleration. However, placing the unladen pallet, such as the placing that resulted in the data presented in Table 1, on a floor would result in a tracking device affixed to the unladen packet generating an indication indicative of the pallet being unladen because more than three acceleration samples shown in Table 1 exceed the acceleration threshold of 0.1 G. In another example, if a movement criterion configured into a tracking device that is to be used to determine whether a pallet corresponding to the tracking device is unladen or not comprises a value, for example 5.0, corresponding to a sum of acceleration values of acceleration samples generated by the accelerometer that exceed a threshold, for example 0.1, then the data shown in Table 2 would result in a movement indication that the pallet is not unladen because the sum of the acceleration values that exceed 0.1 G is less than 5.0, but the data is shown in Table 1 would result in a movement indication that the pallet is unladen because the sum of the acceleration values that exceed 0.1 G is more than 5.0.

Figure 3:
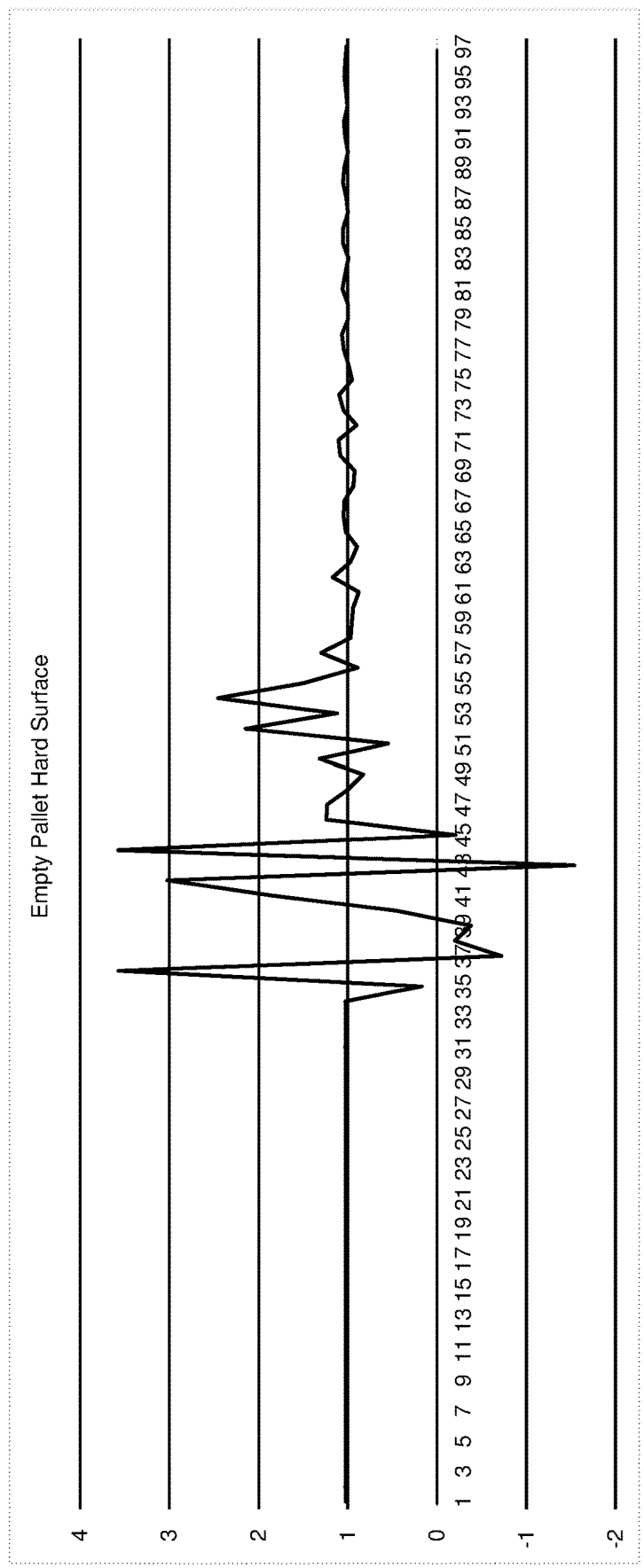
FIG. 3 illustrates a graph of acceleration value samples acquired by a tracking device attached to an unladen pallet.

The graphical representation of the data presented in Table 1 that is shown in FIG. 3 visually shows multiple acceleration values that substantially differ, or deviate, from acceleration due to gravity (e.g., the 1.0 G line on the graph of FIG. 3). The multiple values shown in FIG. 3 may correspond to bouncing of the unladen pallet when placed on the concrete floor. Contrasted with the multiple values shown in FIG. 3, the relatively few (e.g., 2 or 3) acceleration values that appear in FIG. 4 to substantially differ, or deviate, from acceleration due to gravity corresponds to little or no bouncing of the laden pallet, which is weighed down by 50 pounds, when the laden pallet is placed on the concrete floor. In an embodiment, accelerometer 230 may detect movement (e.g., may detect acceleration above a configured movement or wakeup threshold), cause processor 205 to wake up, and begin providing acceleration sample values to processor 205 for analysis with respect to an acceleration decay threshold, an acceleration function, an acceleration threshold, such as a high relative acceleration occurrences threshold, or similar criterion described herein for use in determining whether a pallet is laden or unladen.

Figure 5:
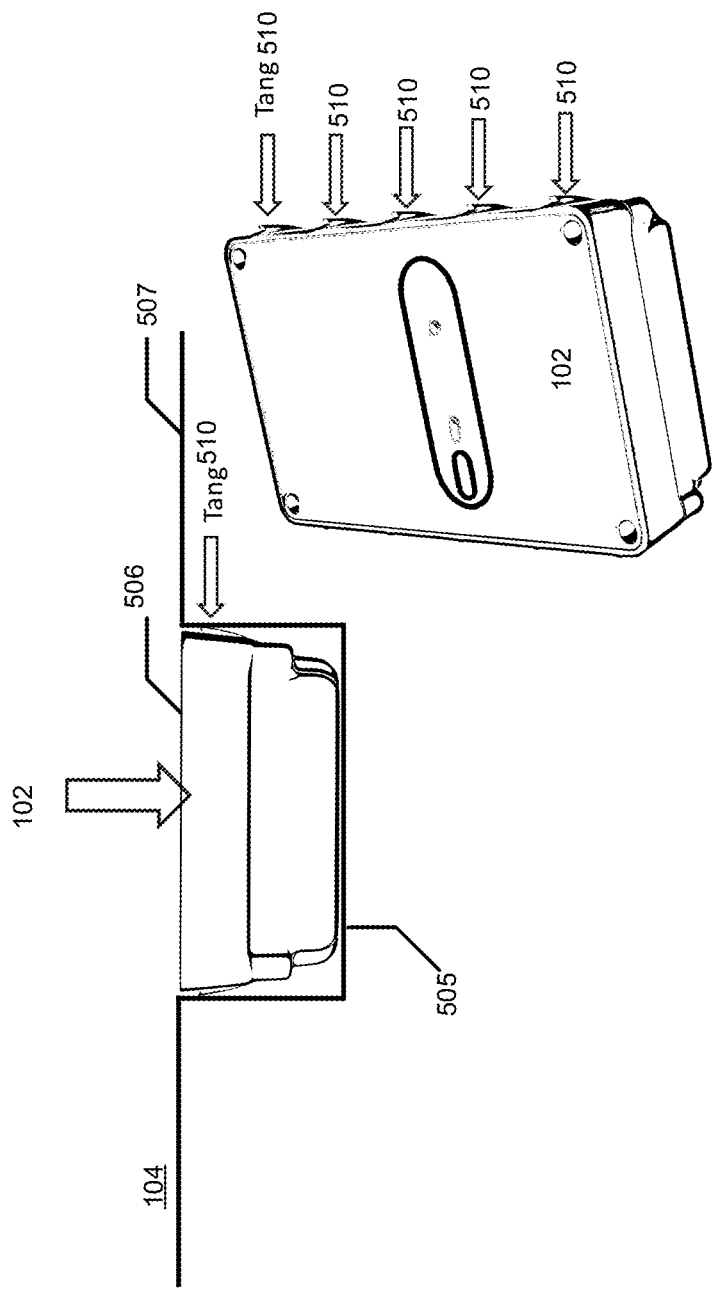
FIG. 5 illustrates a tracking device placed within a pocket formed in a pallet.

Turning now to FIG. 5, the figure illustrates tracking device 102 placed within a pocket 505 that may be formed in pallet 104. Tracking device 102 may comprise one or more ribs 510, or tangs, for creating interference or friction with walls of pocket 505 to retain the tracking device therein. Ribs 510 may result in a snug fit of tracking device 102 into pocket 105 of a pallet but adhesive may be used to further secure tracking device 102 in pocket 505 of pallet 104. Securely attaching tracking 102 to pallet 104 may facilitate an accelerometer of the tracking device generating acceleration value samples that accurately reflect movement of, or forces applied to, the pallet. Tracking device 102 may be placed into pocket 505 such that a top surface 506 of the tracking device may be flush with, or below, a surface 507 of pallet 104. Flush mounting or recessed mounting of tracking device 102 into pocket 505 may facilitate maintenance of the traffic device, for example removing screws that retain a cover of tracking device 102 to facilitate replacement a battery 260.

FIG. 6A illustrates tracking device 102 with multiple ribs 510. Tracking device 102 is shown with a light sensor 240, an environmental sensor port 236 to facilitate operation of one or more temperature, humidity, or barometric pressure sensor(s). Tracking device 102 is shown with an indication LED 250, which may be indicative of battery charge, a radio signal strength, a sleep state, or other status of the tracking device. A location of a tactile push button, which may be hidden beneath a flexible layer of tracking device 102, is indicated by hidden push button 255. FIG. 6B illustrates an end profile view of tracking device 102 with tangs 510 that create interference friction when inserted in a pallet's tracking device pocket, such as pocket 505 shown in FIG. 5, or pocket 805 shown in FIG. 8.

Figure 7:
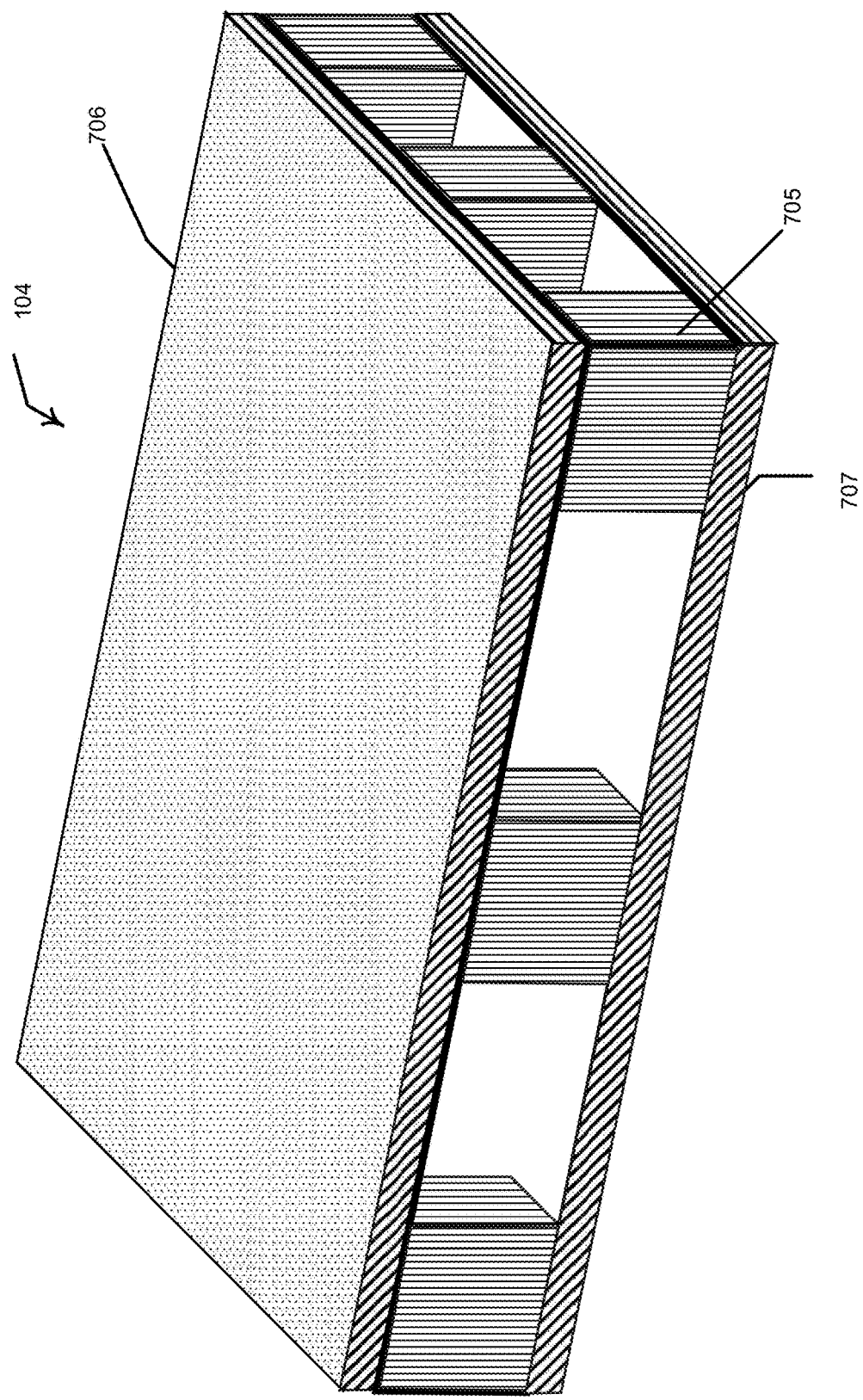
FIG. 7 illustrates a pallet manufactured from a composite material comprising one or more pylons.
Figure 8:
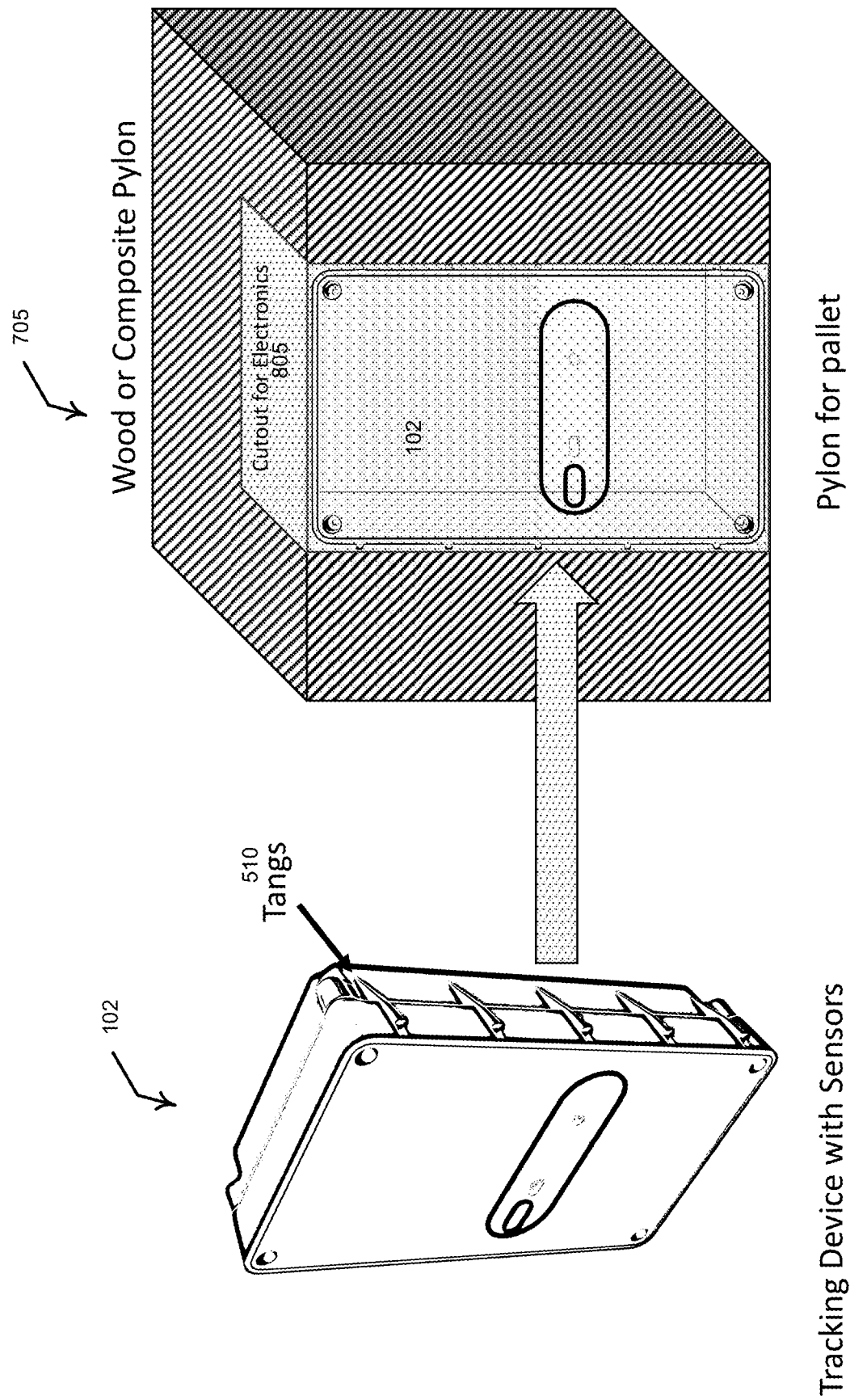
FIG. 8 illustrates a pallet pylon comprising a cutout/pocket for receiving a tracking device.

Turning now to FIG. 7, the figure illustrates a pallet 104 manufactured from a composite material comprising one or more pylons 705 to separate, attach to, connect, or support surfaces 706 and 707 of the pallet. As shown in FIG. 8, pylon 705 may comprise cutout/pocket 805 for receiving tracking device 102 and retaining the tracking device to/within pallet 104. Tangs/ribs 510 may facilitate retaining tracking device 102 into cutout/pocket 805. Affixing tracking device 102 to pylon 705 may be desirable because the pylon may be less flexible than a slat of a pallet and thus may not only protect the tracking device from damage due to loading and transporting of the pallet but may also facilitate providing mechanical indication of movement of the pallet as a whole as compared to the tracking device being fixed to a more flexible portion of the pallet, such as a slat, which could result in less accurate accelerometer acceleration value samples being generated by an accelerometer of the tracking device due to the flexible portion moving (e.g., flexing or vibrating) independently with respect to the pallet as a whole.

Figure 9:
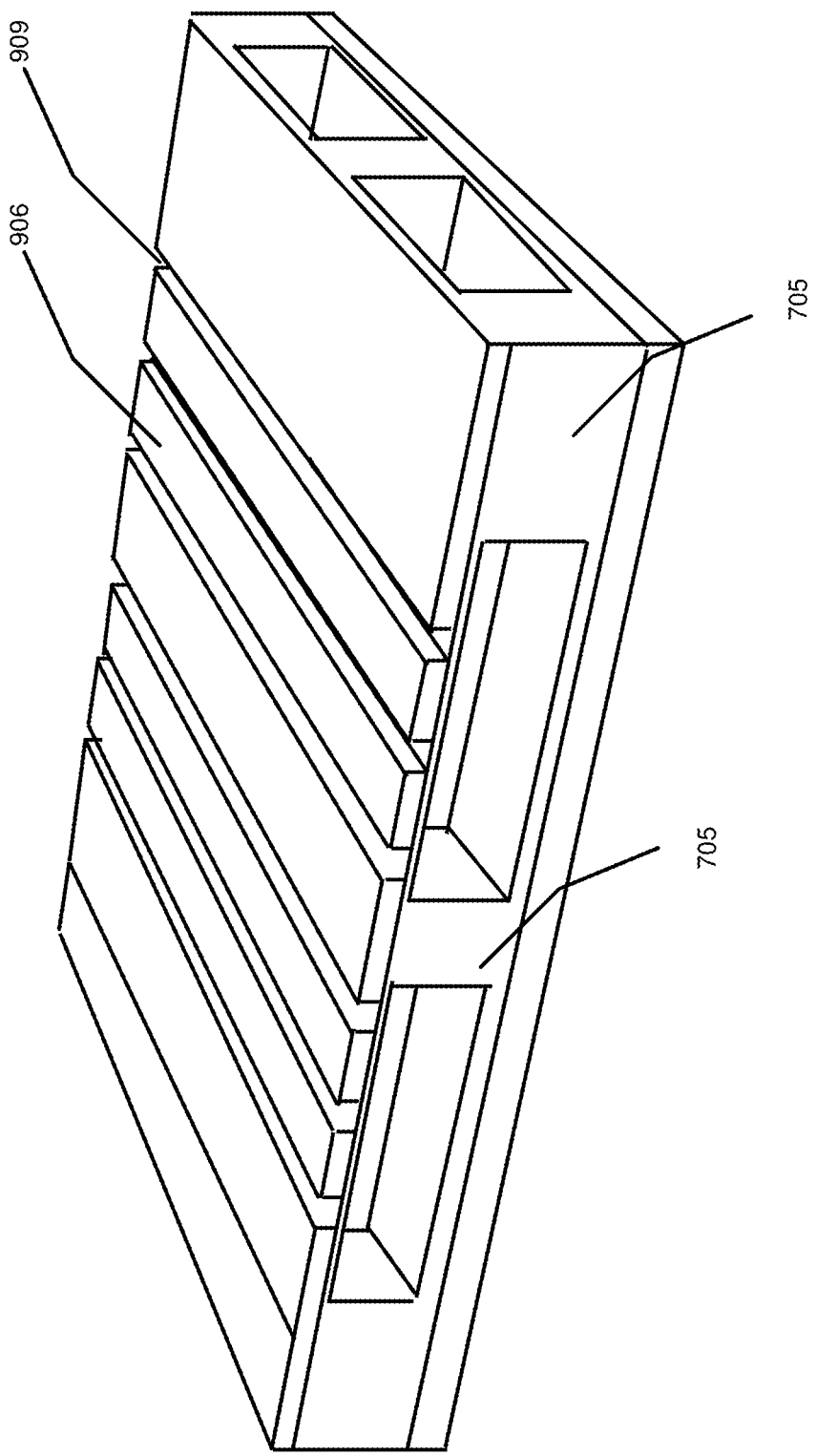
FIG. 9 illustrates a pallet with narrowly-spaced slats supported by pylons.
Figure 10:
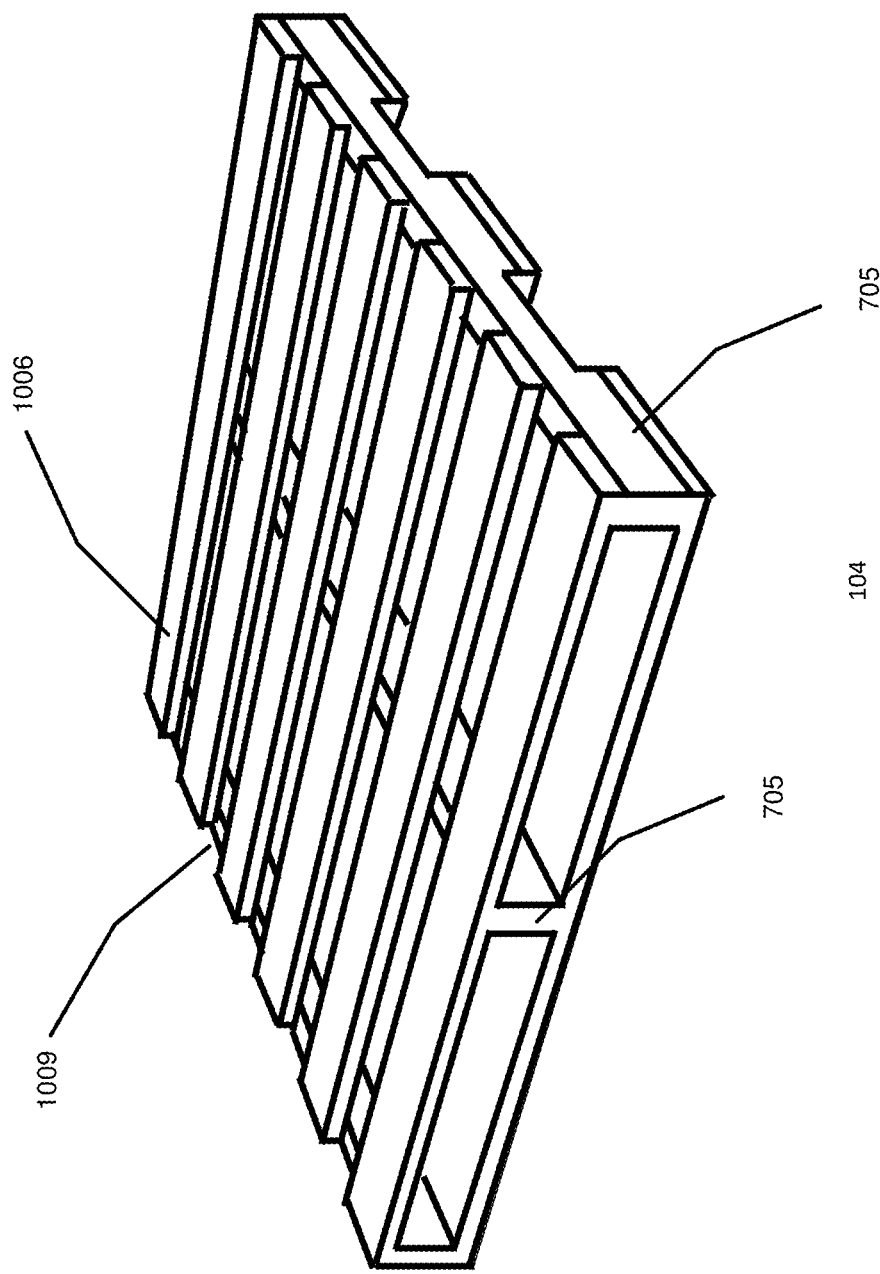
FIG. 10 illustrates a pallet with widely-spaced slats supported by pylons.
Figure 12:
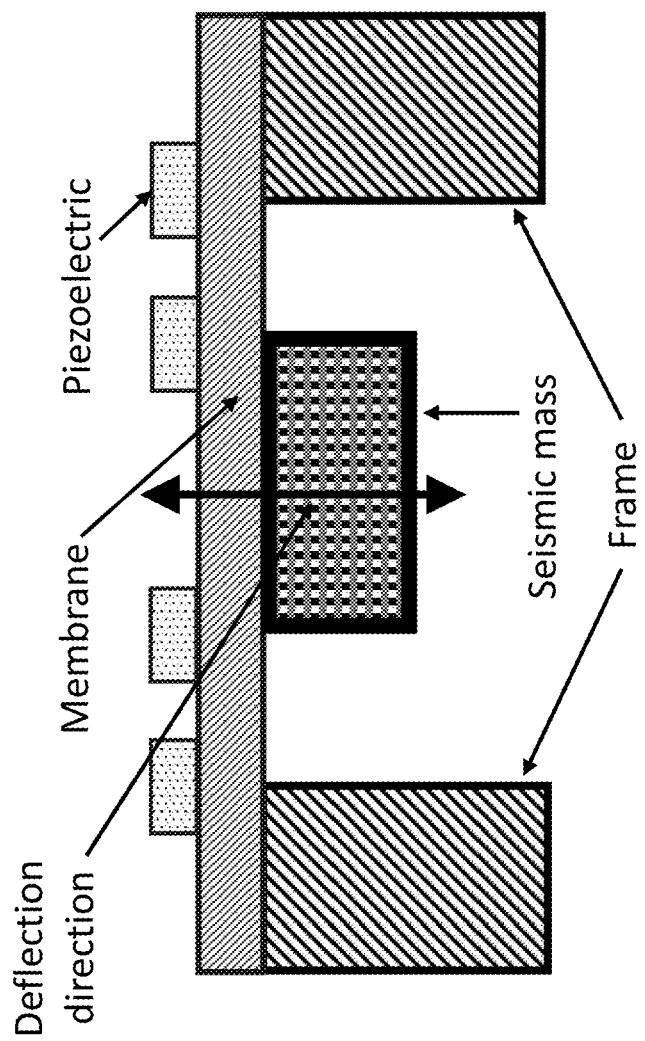
FIG. 12 illustrates an architecture of an example accelerometer.
Figure 13:
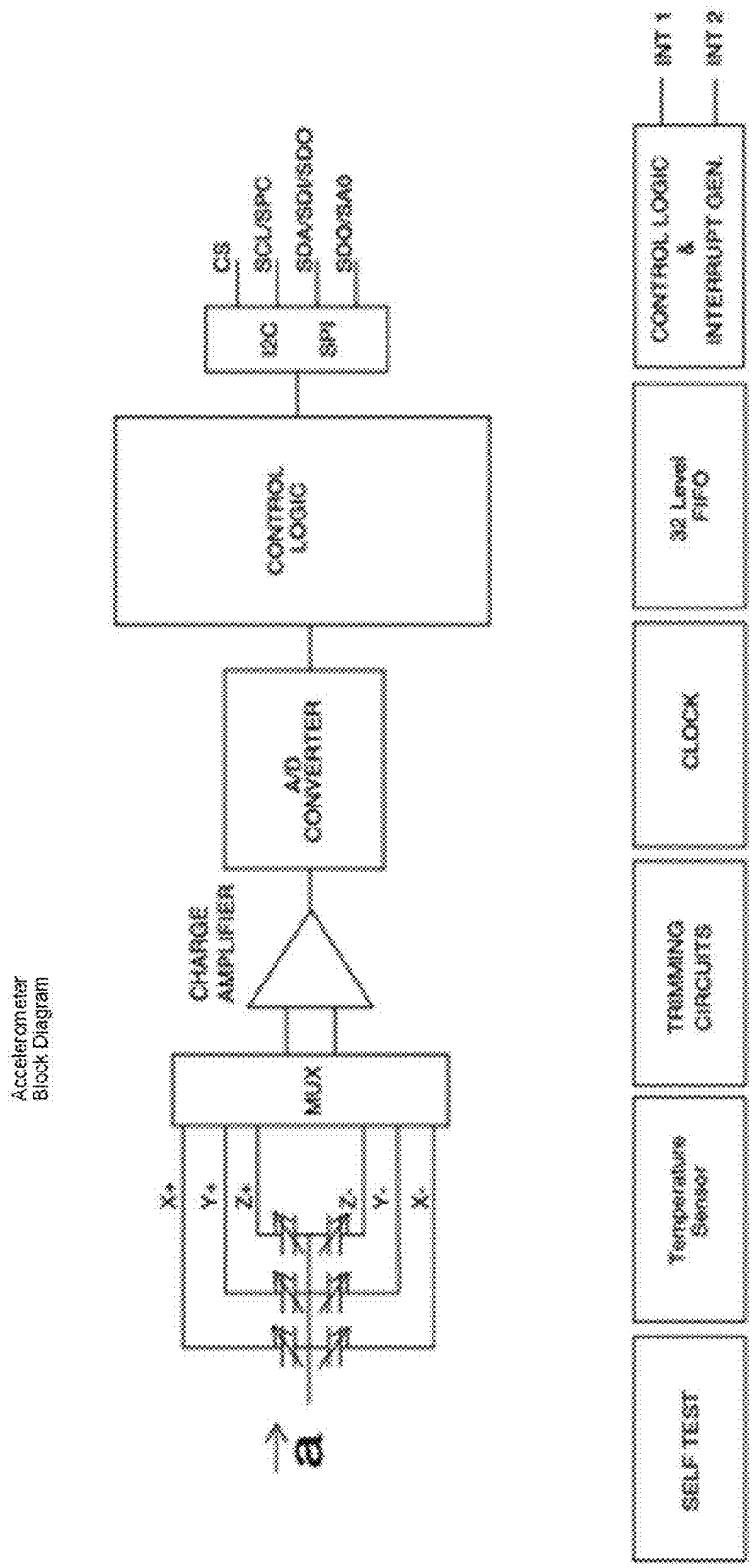
FIG. 13 illustrates a block diagram of an example accelerometer.

Turning now to FIG. 9, the figure illustrates pallet 104 with slats 906 supported by pylons 705. Slats 906 may be separated by narrow gaps 909. FIG. 10 illustrates pallet 104 with slats 1006 supported by pylons 705. Slats 1006 may be separated by wide gaps 1009 that are wider than gaps 909 shown in FIG. 9 (e.g., slats 1006 are spaced farther apart in FIG. 10 than slat 906s in FIG. 9). FIG. 11 illustrates a bar-style tracking device 102 that may be inserted between slats of pallet 104. FIG. 12 Illustrates example architecture of an accelerometer 230. FIG. 13 illustrates a block diagram of an example accelerometer. FIG. 14 illustrates a schematic diagram of a light sensor 240.

Figure 15:
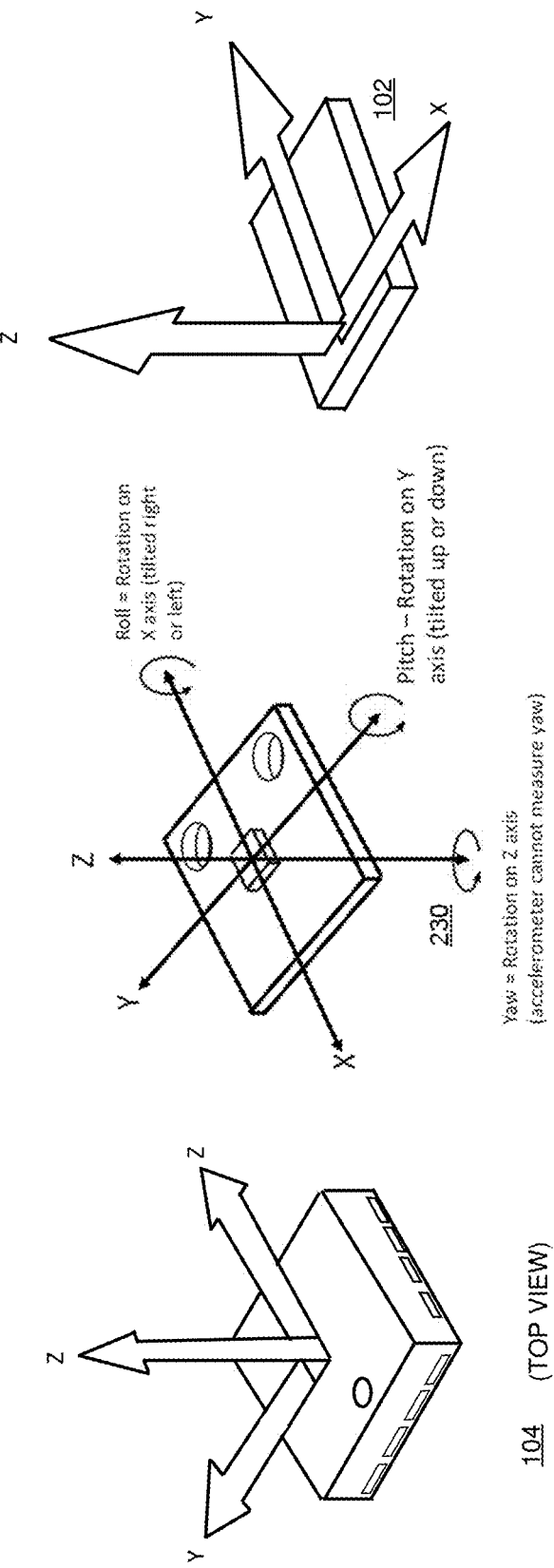
FIG. 15 illustrates X, Y, and Z axes with respect to a pallet, an accelerometer, and a tracking device.

Turning now to FIG. 15, the figure illustrates X, Y, and Z axes with respect to pallet 104, accelerometer 230, and tracking device 102. Thus, because accelerometer device 230 is a component of, and rigidly mounted within, tracking device 102, and because tracking device 102, as described herein, is rigidly fixed to, or within, pallet 104, accelerometer 230 may provide sample acceleration values in the X, Y, and Z directions that correspond to movement of, or forces acting on, pallet 104 in respective X, Y, and Z directions.

Figure 16:
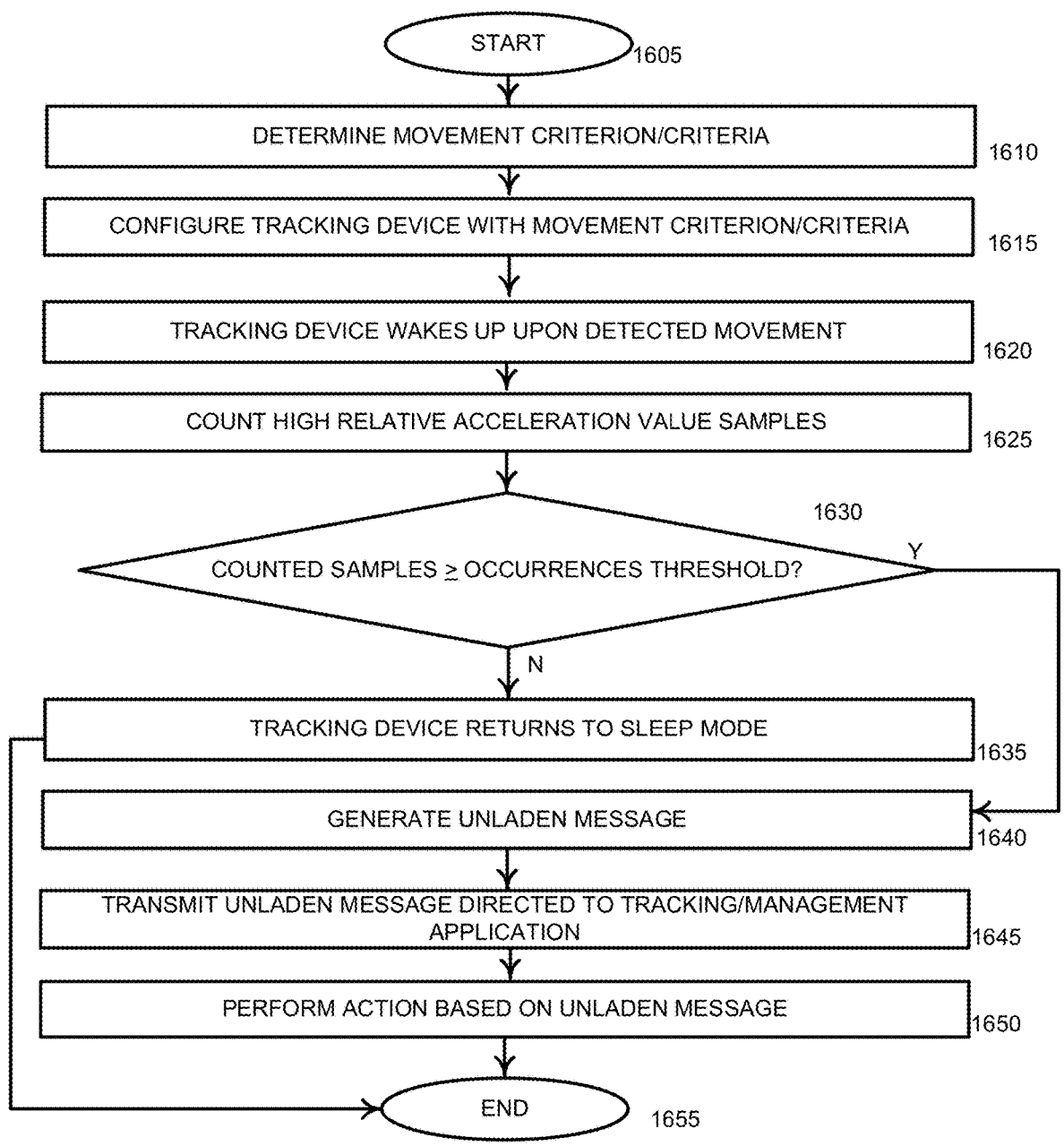
FIG. 16 illustrates a flow diagram of an example method.

Turning now to FIG. 16, the figure illustrates a flow diagram of an example embodiment 1600. Method 1600 begins at act 1605. At act 1610, movement criterion, such as criterion described and illustrated in reference to Tables 1 and 2, and FIGS. 3 and 4, respectively, may be determined from testing activities and results obtained therefrom. At Act 1615, a tracking device such as tracking device 102 described herein, may be configured with a determined movement criterion. A movement criterion may be used by the tracking device to determine whether an object or asset, for example a pallet 104 as described, has experienced motion or forces acting on the object causing the object to move. For example, acceleration value samples generated by an accelerometer of a tracking device may be analyzed with respect to a criterion, or criteria. The criterion/criteria may comprise an acceleration magnitude threshold. The criterion/criteria may comprise a threshold number of acceleration value samples generated by the accelerometer that exceed the magnitude threshold.

At act 1620, a processor of the tracking device may wake up on generation by an accelerometer of the tracking device that corresponds to movement of the tracking device. Upon movement of the tracking device, the accelerometer may generate at least one acceleration value sample corresponding to acceleration values that exceed a wake-up magnitude threshold. The at least one acceleration value sample exceeding the wake-up magnitude threshold may cause the processor to exit a sleep state and begin monitoring and analyzing acceleration value samples generated by the accelerometer. At act 1620, the processor of the tracking device may determine a count of a number of acceleration value samples that correspond to high relative acceleration values, for example, a high relative acceleration value may be a value that exceeds, by a configured acceleration amount, a configured baseline magnitude threshold, that may correspond to acceleration due to gravity.

At act 1630, the processor of the tracking device may determine whether the count of high relative acceleration value samples exceeds a configured high relative acceleration value occurrences threshold. The high relative acceleration occurrences threshold may correspond to a number of high relative acceleration values derived from testing, for example testing of a pallet that is loaded with a weighty object. If a determination is made at act 1630 that a count of high relative acceleration values does not satisfy an occurrences threshold, for example the count of high relative acceleration values determined at act 1625 is not greater than or equal to the occurrences threshold, method 1600 may advance to act 1635. The tracking device processor may enter a sleep mode at act 1635 before method 1600 advances to act 1655 and ends.

Returning to description of act 1630, if a determination is made by a processor of the tracking device that a counted number of high relative acceleration value samples satisfies an occurrences threshold, for example is greater than or equal to the occurrences threshold, method 1600 advances to act 1640. At act 1640, the processor of the tracking device may cause an unladen pallet message to be generated. The unladen pallet message may be directed to a tracking management application, which may be referred to as an asset management application. The tracking management application may be executing on a user equipment that is communicating with the tracking device via a short-range wireless communication link. The tracking management application may be executing on a tracking device server, such as server 140 shown in FIG. 1, that is located remotely with respect to the tracking device, in which case the processor of the tracking device may cause the unladen pallet message to be transmitted to a radio access network node of a radio access network, for forwarding to the tracking management application to which the unladen pallet message is directed. The unladen pallet message may be used by the tracking management application to facilitate operations at act 1650, for example logistics operations, that may comprise causing one or more pallets to be shipped to a determined location, or causing unladen pallets to be collected from, or shipped from, one or more locations corresponding to the unladen pallets. Method 1600 advances to act 1655 and ends.

Operations that may be facilitated at act 1650 may be performed by an entity, such as, for example, a pallet management company. If an indication in an unladen pallet message is indicative that the pallet is at a factory or origination corresponding to the pallet the pallet management company may disregard the unladen pallet message. The tracking device may analyze a period between waking up due to movement and a determination that the pallet is set down regardless of whether acceleration value samples from an accelerometer indicate that a pallet corresponding to the tracking device is late in or not to determine whether acceleration values that are high relative acceleration values correspond to the pallet being set down or correspond merely to the pallet being bumped, kicked, or knocked over instead of being set down. For example, if an acceleration value that causes the processor of the tracking device to wake up but the processor of the tracking device determines that further acceleration values that may be high relative acceleration values have not been generated by the accelerometer, the processor of the tracking device may determine that movement that caused the processor to wake did not correspond to the pallet being set down, but may have instead correspond to the incidental movement of the pallet. Thus, regardless of whether the processor may determine that the pallet is laden or unladen based on a number of high relative acceleration values, the processor may not generate or transmit an unladen pallet message because another unladen pallet message should have already been transmitted to a tracking management application when the pallet was first placed down after being unloaded or unladen. Thus, use of radio resources to transmit an unladen pallet message can be avoided. A tracking management application may count how many unladen pallets leave an origination location based on unladen pallet messages received from multiple tracking devices affixed to the respective pallets and may automatically cause replacement pallets to be transported to the original location. A tracking management application may count how many unladen pallets are located at a destination location and cause the unladen pallets to be retrieved from the pallets' respective location(s).

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a computing device comprising a processor, at least one movement indication indicative of movement of a tracking device;
    analyzing, by the computing device, the at least one tracking device movement indication with respect to a tracking device movement criterion to result in an analyzed movement indication;
    determining, by the computing device, that the analyzed movement indication satisfies the tracking device movement criterion to result in a determined movement indication;
    based on the determined movement indication, generating, by the computing device, an unladen indication indicative that the tracking device corresponds to an unladen transportation asset.

2. The method of claim 1, wherein the unladen transportation asset is a pallet.

3. The method of claim 1, wherein the tracking device movement criterion comprises an acceleration decay threshold.

4. The method of claim 3, wherein the at least one movement indication corresponds to at least one respective acceleration magnitude sample generated by the tracking device, wherein the acceleration decay threshold is a number of the at least one acceleration magnitude sample that differs from a baseline acceleration magnitude more than a configured acceleration magnitude.

5. The method of claim 3, wherein the at least one movement indication corresponds to at least one respective acceleration magnitude sample generated by the tracking device, wherein the acceleration threshold is an acceleration magnitude.

6. The method of claim 1, wherein the movement indication is a final movement indication corresponding to a final movement of the tracking device, the method further comprising:
receiving, by the computing device, an initial movement indication indicative of an initial movement of the tracking device, wherein the initial movement resulted in the tracking device waking up.

7. The method of claim 6, further comprising:
determining, by the computing device, a movement period corresponding to a period between the initial movement and the final movement;
analyzing the movement period with respect to a movement period criterion to result in an analyzed movement period;
determining, by the computing device, based on the analyzed movement period satisfying the movement period criterion, that the final movement corresponds to the unladen transportation asset being set down to result in a determined set-down occurrence.

8. The method of claim 7, further comprising:
determining, by the computing device, that the determined set-down occurrence satisfies a set down occurrence criterion; and
based on the determined set-down occurrence satisfying the set down occurrence criterion, transmitting, by the computing device to a management computing system, a retrieval indication indicative that at least the unladen transportation asset is to be retrieved from a current location of the unladen transportation asset and transported to a target location.

9. The method of claim 8, wherein the management computing system corresponds to an owner of the unladen transportation asset.

10. The method of claim 6, further comprising:
determining, by the computing device, a movement period corresponding to a period between the initial movement and the final movement;
analyzing the movement period with respect to a movement period criterion to result in an analyzed movement period;
determining, by the computing device, based on the analyzed movement period failing to satisfy the movement period criterion, that the final movement corresponds to nonmovement, with respect to location, of an object with which the tracking device is associated.

11. The method of claim 1, wherein the computing device is part of the tracking device.

12. A tracking device, comprising:
a motion detecting component; and
a processor configured to:
receive, from the motion detecting component, at least one movement indication indicative of movement of the tracking device;
analyze the at least one tracking device movement indication with respect to a tracking device movement criterion to result in an analyzed movement indication;
determine that the analyzed movement indication satisfies the tracking device movement criterion to result in a determined movement indication; and
based on the determined movement indication, generate an unladen indication indicative that the tracking device corresponds to an unladen transportation asset.

13. The tracking device of claim 1, wherein the tracking device movement criterion comprises an acceleration function.

14. The tracking device of claim 13, wherein the acceleration function comprises an acceleration threshold and wherein the tracking device movement criterion is satisfied by the at least one movement indication being indicative of an acceleration value that exceeds the acceleration threshold.

15. The tracking device of claim 12, wherein the motion detecting component comprises an accelerometer, wherein the at least one movement indication is a first at least one movement indication, and wherein the processor is further configured to:
receive, from the motion detecting component before receiving the first at least one movement indication, a second of the at least one movement indication indicative of movement of the tracking device; and
exit a sleep state upon receiving the second at least one movement indication;
wherein the tracking device movement criterion comprises an acceleration function.

16. The tracking device of claim 15, wherein the processor is further configured to:
determine a movement period beginning at a first time corresponding to the second movement indication and ending at a second time corresponding to the first movement indication;
analyze the movement period with respect to a movement period criterion to result in an analyzed movement period;
determine that the analyzed movement period satisfies the movement period criterion to result in a determined movement period; and
based on the determined movement period, determine that an asset corresponding to the tracking device has been intentionally moved.

17. A non-transitory machine-readable medium, comprising executable instructions that, when executed by a processor of a tracking device, facilitate performance of operations, comprising:
receiving, from a movement detecting component of the tracking device, at least one movement indication indicative of movement of an asset corresponding to the tracking device;
analyzing the at least one tracking device movement indication with respect to a tracking device movement criterion to result in an analyzed movement indication;
based on the analyzed movement indication, generating, by the computing device, a laden indication indicative of a laden characteristic of the asset; and
transmitting a laden characteristic message, directed to an asset management application, indicative of the laden characteristic.

18. The non-transitory machine-readable medium of claim 17, wherein the tracking device movement criterion comprises an acceleration function, and wherein the laden indication is indicative that the laden characteristic corresponds to the asset being unladen.

19. The non-transitory machine-readable medium of claim 18, wherein the acceleration function comprises an acceleration threshold and wherein the tracking device movement criterion comprises a high relative acceleration occurrences threshold, wherein the at least one movement indication comprises at least one high relative acceleration magnitude value, and wherein the at least one high relative acceleration magnitude value equaling or exceeding the acceleration threshold occurring as frequently as, or more frequently than, the high relative acceleration occurrences threshold corresponds to the asset being unladen.

20. The non-transitory machine-readable medium of claim 17, wherein the acceleration function comprises an acceleration threshold and wherein the tracking device movement criterion comprises a high relative acceleration occurrences threshold, wherein an at least one high relative acceleration magnitude equaling or exceeding the acceleration threshold occurring less frequently than a high relative acceleration occurrences threshold corresponds to the asset being laden.

\* \* \* \* \*